(12) United States Patent
Asao et al.

(10) Patent No.: US 6,760,965 B2
(45) Date of Patent: *Jul. 13, 2004

(54) METHOD FOR MANUFACTURING AN ALTERNATOR

(75) Inventors: Yoshihito Asao, Tokyo (JP); Katsumi Adachi, Tokyo (JP); Akira Morishita, Tokyo (JP); Atsushi Oohashi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/740,862

(22) Filed: Dec. 21, 2000

(65) Prior Publication Data

US 2002/0092152 A1 Jul. 18, 2002

Related U.S. Application Data

(63) Continuation of application No. 09/624,223, filed on Jul. 24, 2000, now Pat. No. 6,687,974.

(30) Foreign Application Priority Data

Dec. 27, 1999 (JP) .......................................... 11-377167
Oct. 18, 2000 (JP) ...................................... 2000-318028

(51) Int. Cl.[7] .............................................. H02K 15/16
(52) U.S. Cl. ............................. 29/596; 29/598; 29/605; 310/216; 310/179; 310/154
(58) Field of Search .......................... 29/596, 598, 605, 29/732, 606, 607, 608, 609; 310/216, 154, 156, 179

(56) References Cited

U.S. PATENT DOCUMENTS

| | | | |
|---|---|---|---|
| 2,354,551 A | | 7/1944 | Sawyer |
| 4,829,206 A | | 5/1989 | Honshima et al. |
| 5,592,731 A | * | 1/1997 | Huang et al. .................. 29/596 |
| 5,729,072 A | | 3/1998 | Hirano et al. |
| 5,845,389 A | * | 12/1998 | Roberts et al. ............... 29/596 |
| 5,994,813 A | * | 11/1999 | Umeda et al. .............. 310/180 |
| 6,140,735 A | * | 10/2000 | Kato et al. .................. 310/201 |

FOREIGN PATENT DOCUMENTS

| | | |
|---|---|---|
| DE | 196 33 399 | 2/1998 |
| EP | 0 824 288 | 2/1998 |
| JP | 09103052 | * 4/1997 |

OTHER PUBLICATIONS

Patent Abstracts of Japan, vol. 1999, No. 04, Apr. 30, 1999 & JP11–018378 (Denso Corp.), Jan. 22, 1999.
Patent Abstracts of Japan, vol. 1997, No. 08, Aug. 29, 1997 & JP09–103052 (Mitsubishi Electric Corp.), Apr. 15, 1997.
Patent Abstracts of Japan, vol. 012, No. 476 (E–693), Dec. 13, 1998 & JP63–194543 (Hitachi Ltd.), Aug. 11, 1988.
Patent Abstracts of Japan, vol. 088, No. 066 (E–234), Mar. 28, 1984 & JP58–215944 (Matsushita Denki Sangyo K.K.), Dec. 15, 1983.
Patent Abstracts of Japan, vol. 1999, No. 11, Sep. 30, 1999 & JP11–164519 (Denso Corp.), Jun. 18, 1999.

* cited by examiner

Primary Examiner—I Cuda Rosen Baum
Assistant Examiner—Stephen Kenny
(74) Attorney, Agent, or Firm—Sughrue Mion, PLLC

(57) ABSTRACT

A method for manufacturing an alternator includes preparing a winding assembly formed by bending strands of wire so as to have straight portions which fit into slots, forming a base core by laminating plate-shaped magnetic members formed with the slots, stacking the winding assembly on the base core and pressing the winding assembly such that the straight portions enter the slots, and forming the stator core by bending the base core into a cylindrical shape and abutting end surfaces of the base core.

11 Claims, 38 Drawing Sheets

FIG. 18
(a)
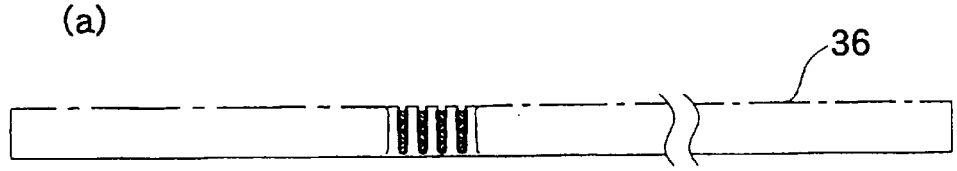
(b)
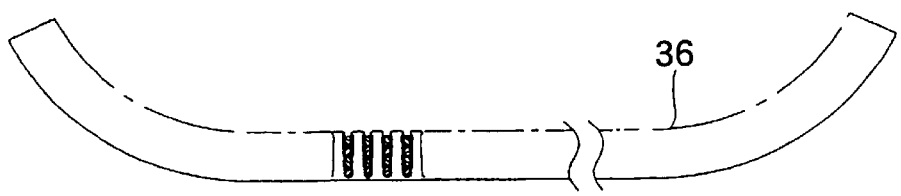
(c)
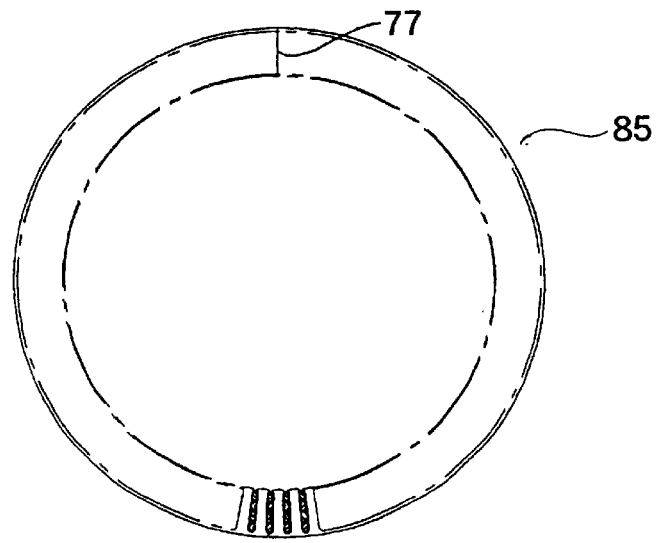

METHOD FOR MANUFACTURING AN ALTERNATOR

This Application is a Continuation of Ser. No. 09/024223 Filed Jul. 24, 2000, now U.S. Pat. No. 6,687,974.

BACKGROUND OF THE INVENTION

1. Field of the Invention

The present invention relates to a method for manufacturing an alternator driven by an internal combustion engine mounted to an automotive vehicle such as a passenger car or a truck, for example.

2. Description of the Related Art

FIG. 34 is a perspective of a stator of a conventional automotive alternator such as described in Japanese Patent No. 2927288, for example, FIG. 35 is a perspective showing a conductor segment used in the stator in FIG. 34, and FIGS. 36 and 37 are perspectives from a front end and a rear end, respectively, of part of the stator in FIG. 34.

This stator 300 includes: a stator core 301; a stator winding 302 wound onto the stator core 301; and insulators 304 mounted inside slots 303, the insulators 304 insulating the stator winding 302 from the stator core 301. The stator core 301 is a cylindrical laminated core laminated by stacking thin steel plates which are plate-shaped magnetic members, and has a number of slots 303 extending axially disposed at even pitch circumferentially so as to be open on an inner circumferential side. The stator winding 302 is constructed by joining a number of short conductor segments 305 in a predetermined winding pattern.

The conductor segments 305 are formed into a general U shape from an insulated copper wire material having a rectangular cross section, and are inserted from an axial rear end into pairs of slots 303 six slots apart (a pitch of one magnetic pole). Then, end portions of the conductor segments 305 extending outwards at a front end are joined to each other to constitute the stator winding 302.

More specifically, in pairs of slots 303 six slots apart, first conductor segments 305 are inserted from the rear end into first positions from an outer circumferential side within first slots 303 and into second positions from the outer circumferential side within second slots 303, and second conductor segments 305 are inserted from the rear end into third positions from the outer circumferential side within the first slots 303 and into fourth positions from the outer circumferential side within the second slots 303. Thus, within each slot 303, four straight portions 305a of the conductor segments 305 are arranged to line up in a row in a radial direction.

Then, end portions 305b of the conductor segments 305 extending outwards at the front end from the first positions from the outer circumferential side within the first slots 303 and end portions 305b of the conductor segments 305 extending outwards at the front end from the second positions from the outer circumferential side within the second slots 303 six slots away in a clockwise direction from the first slots 303 are joined to form an outer layer winding having two turns. In addition, end portions 305b of the conductor segments 305 extending outwards at the front end from the third positions from the outer circumferential side within the first slots 303 and end portions 305b of the conductor segments 305 extending outwards at the front end from the fourth positions from the outer circumferential side within the second slots 303 six slots away in a clockwise direction from the first slots 303 are joined to form an inner layer winding having two turns.

In addition, the inner layer winding and outer layer winding constituted by the conductor segments 305 inserted into the pairs of slots 303 six slots apart are connected in series to form one phase of the stator winding 302 having four turns.

A total of six phases of the stator winding 302 each having four turns are formed similarly. Then, two sets of three-phase stator winding sub-portions are constructed by connecting three phases each of the stator winding 302 into alternating-current connections.

In the conventional stator 300 constructed in this manner, at the rear end of the stator core 301, turn portions 305c of the pairs of conductor segments 305 inserted into the same pairs of slots 303 are lined up in rows in a radial direction. As a result, the return portions 305c are arranged in two rows circumferentially to constitute a rear-end coil end group.

At the front end of the stator core 301, on the other hand, joint portions formed by joining the end portions 305b of the conductor segments 305 extending outwards at the front end from the first positions from the outer circumferential side within the first slots 303 and the end portions 305b of the conductor segments 305 extending outwards at the front end from the second positions from the outer circumferential side within the second slots 303 six slots away, and joint portions formed by joining the end portions 305b of the conductor segments 305 extending outwards at the front end from the third positions from the outer circumferential side within the first slots 303 and the end portions 305b of the conductor segments 305 extending outwards at the front end from the fourth positions from the outer circumferential side within the second slots 303 six slots away are arranged to line up radially. As a result, joint portions formed by joining end portions 305b to each other are arranged in two rows circumferentially to constitute a front-end coil end group.

In the stator 300 of an automotive alternator having the above construction, because the stator winding 302 is constructed by inserting short conductor segments 305 formed in the general U shape into the slots 303 of the stator core 301 from the rear end and joining end portions 305b of the conductor segments 305 extending outwards at the front end, the coil end groups are composed of a large number of joint portions, allowing short-circuiting accidents to occur easily because the joint portions easily short-circuit with each other.

A large number of the short conductor segments 305 must be inserted into the stator core 301 and their end portions must be joined by welding, soldering, etc., making operability significantly poor. Furthermore, the amount of each conductor segment 305 which is inserted into the slots 303 must be greater than the length of the stator core 301, facilitating damage to the insulation and reducing the quality of the finished product. In addition, when joining the end portions, short-circuiting often occurs between the joint portions due to spilt solder or weld melt, making mass-producibility significantly poor.

In contrast to the conventional construction using conductor segments 305, Japanese Patent Laid-Open No. HEI 8-298756 discloses a stator construction consisting of a number of coil pieces formed by winding a number of straight-angled conductors a number of times into a generally hexagonal shape in advance and inserting the coil pieces into slots in semicircular divided core portions.

In this stator, the coil pieces are inserted into the slots of the semicircular divided core portions in order in a radially outward direction. In other words, first facing side portions of the hexagonal coil pieces are positioned in an inner circumferential layer which is a layer on the inner side of the slots, and second facing side portions are positioned in an outer circumferential layer which is a layer on the outer side a predetermined number of slots away.

In this stator, although the alignment of the coil end groups extending outwards from the slots is good, when joining the divided core portions to each other, the first side portions of the coil pieces are already inserted into the slots of a first divided core portion but because it is necessary to perform the operation of inserting the coil pieces into the slots of a second divided core portion at the same time as the operation of connecting the divided core portions, a temporary holding jig or the like must be used to perform a complicated operation, making productivity significantly poor.

Forming the stator core by joining a number of divided core portions has also been troublesome, and forming the radial dimensions, etc., of each of the divided core portions so as to be uniform has been difficult.

Japanese Patent Laid-Open No. HEI 9-103052 discloses a stator 400 in which winding groups formed in a straight shape are inserted into a straight-shaped base core in a slot depth direction and the base core is bent into a cylindrical shape in a later process in order to improve the space factor of the conductors in the slots. FIG. 38 is an overall perspective of the stator 400 manufactured by this method. Although, insertion of the winding groups is significantly improved, because the winding groups have straight bridging portions extending circumferentially between the slots 401, the alignment of coil ends 402 extending outwards from the slots 401 is significantly poor, leading to increased radial dimensions and short-circuiting between the conductors in the coil ends 402. Furthermore, because the straight-shaped base core is made into a cylinder without modification, a significant amount of bending force is required and spring back is strong, leading to problems such as the formation of gaps at the joined surfaces in the resulting cylinder, and to deterioration in output and magnetic noise, etc.

In the conventional automotive alternator disclosed in Japanese Patent No. 2927288, problems have been that a large number of the short conductor segments 305 must be inserted into the stator core 301 and their end portions must be joined by welding, soldering, etc., making operability significantly poor, and when joining the end portions, that short-circuiting often occurs between the joint portions due to spilt solder or weld melt, making mass-producibility significantly poor.

In the alternator of Japanese Patent Laid-Open No. HEI 8-298756, problems have been that forming the stator core by joining a number of divided core portions has been troublesome, requiring a complicated operation using a temporary holding jig, thereby making the assembly operation of the stator poor.

In the automotive alternator disclosed in Japanese Patent Laid-Open No. HEI 9-103052, the alignment of coil ends 402 extending outwards from the slots 401 is significantly poor, leading to increased radial dimensions and short-circuiting between the conductors in the coil ends 402, and a significant amount of bending force is required to make the straight-shaped base core into a cylinder without special treatment, making spring back strong and leading to problems such as the formation of gaps at the joint surface in the resulting cylinder, deterioration in output and magnetic noise, etc.

SUMMARY OF THE INVENTION

The present invention aims to solve the above problems and an object of the present invention is to provide a method for manufacturing a mass-producible alternator for which the assembly operation is significantly improved.

To this end, according to one aspect of the present invention, there is provided a method for manufacturing an alternator comprising: preparing a winding assembly formed by bending strands of wire so as to have straight portions which fit into slots; forming a base core by laminating plate-shaped magnetic members formed with the slots; stacking the winding assembly on the base core and pressing said the winding assembly such that the straight portions enter the slots; and forming a stator core by bending the base core into a cylindrical shape and abutting end surfaces of the base core.

According to another aspect of the present invention, there is provided a method for manufacturing an alternator comprising: preparing winding assembly formed by bending strands of wire so as to have straight portions which fit into slots; forming a base core by laminating plate-shaped magnetic members formed with the slots; stacking the winding assembly on the base core and pressing the winding assembly such that the straight portions enter the slots; forming a inner circumferential core portion by bending the base core into a cylindrical shape; and fitting outer circumferential core portion over the inner circumferential core portion.

BRIEF DESCRIPTION OF THE DRAWINGS

FIGS. 18(a), (b), and (c) are diagrams explaining the process of bending the inner circumferential core portion in FIG. 5.

DETAILED DESCRIPTION OF THE PREFERRED EMBODIMENTS

Embodiment 1

Figure 1:
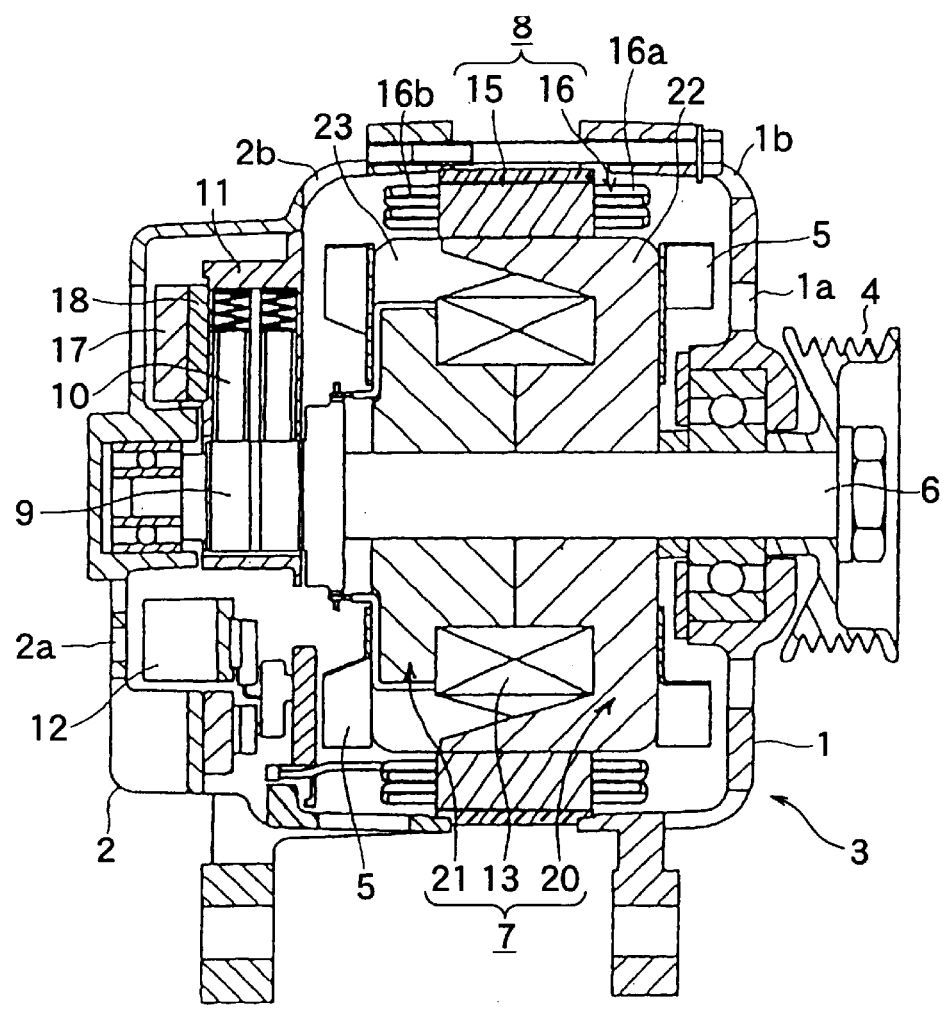
FIG. 1 is a cross section of an automotive alternator according to Embodiment 1 of the present invention.
Figure 2:
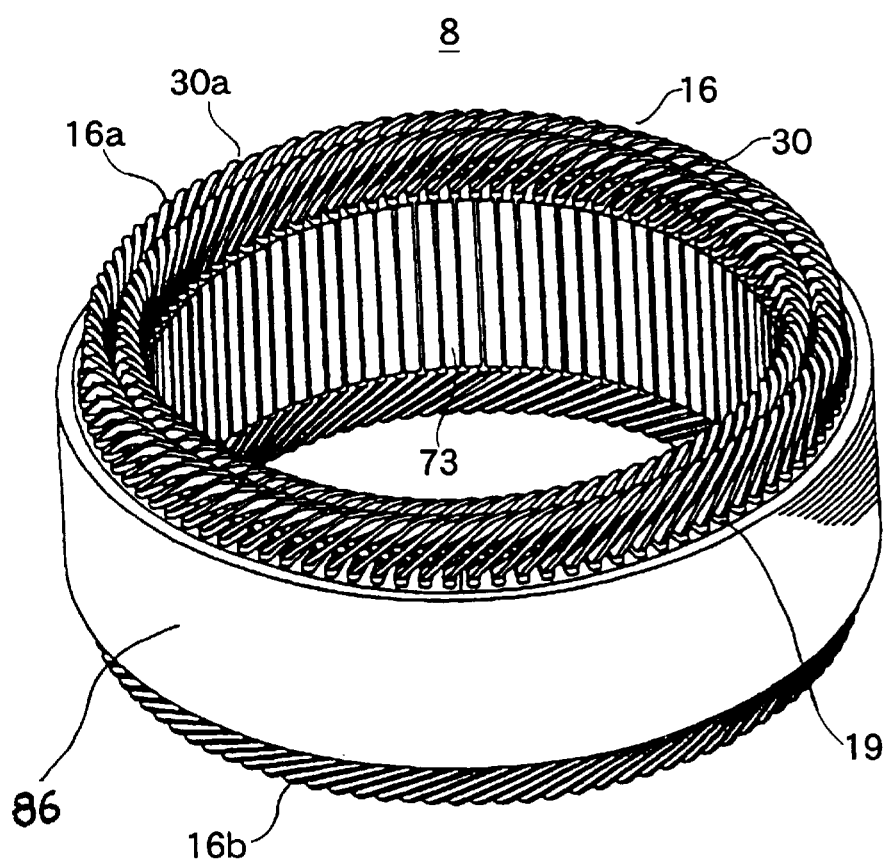
FIG. 2 is a perspective of a stator in FIG. 1.
Figure 3:
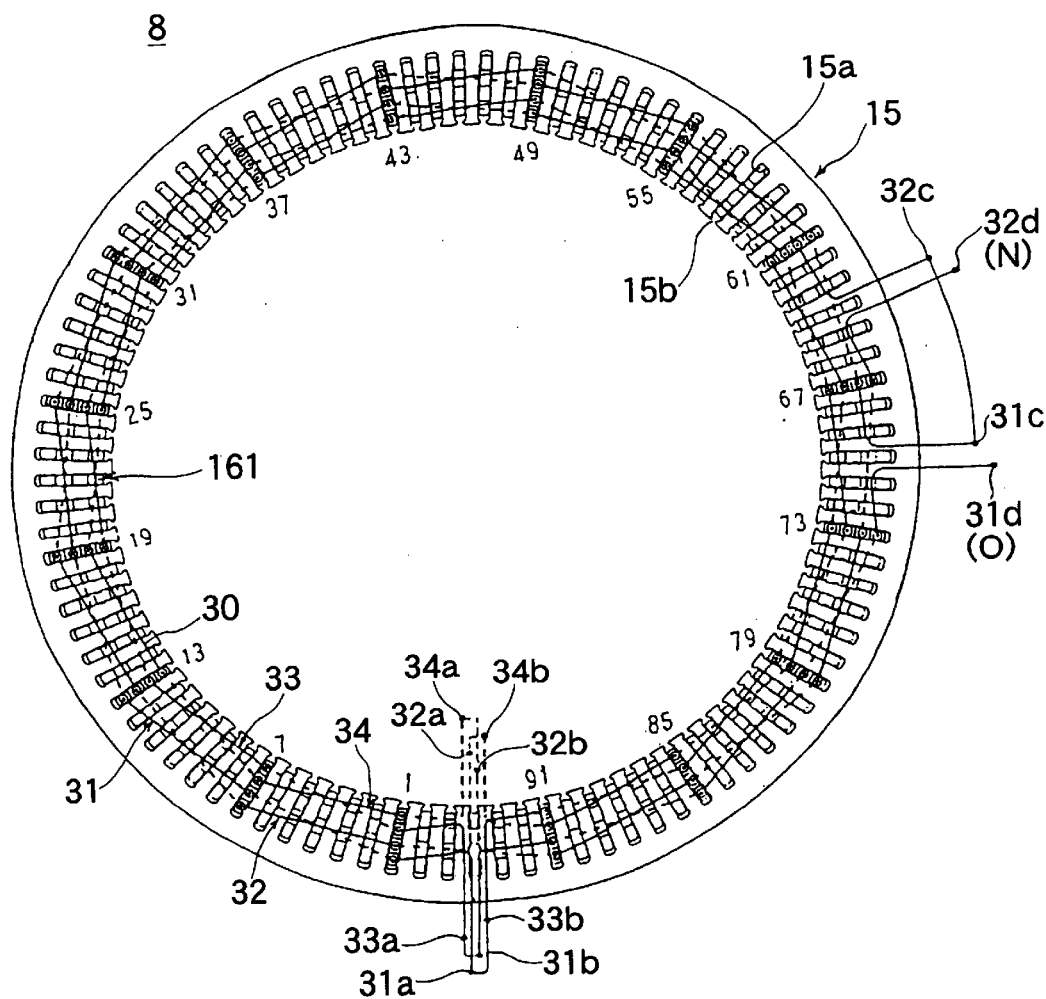
FIG. 3 is an end elevation explaining connections in one phase of stator winding group in FIG. 1.
Figure 4:
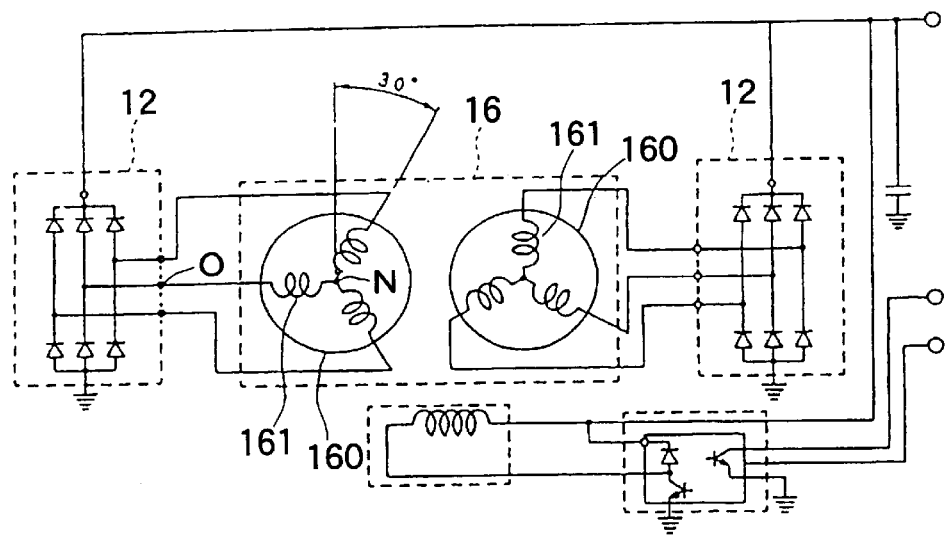
FIG. 4 is a circuit diagram for the automotive alternator in FIG. 1.
Figure 5:
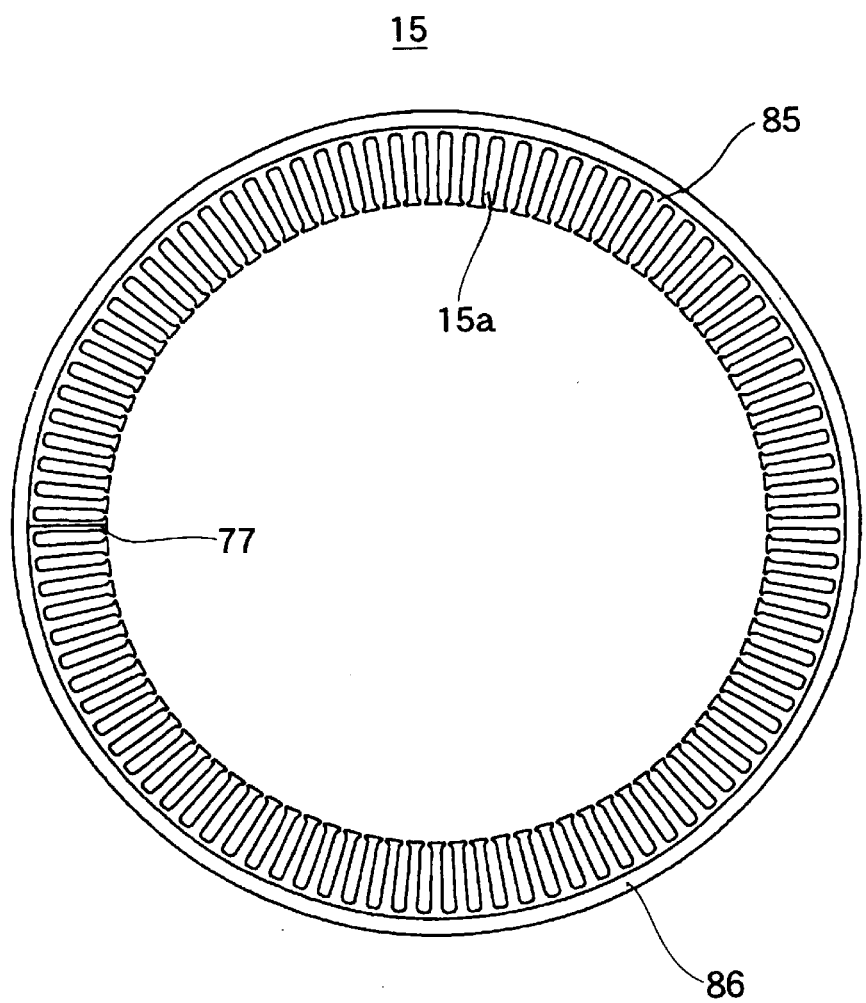
FIG. 5 is a cross section of a stator core in FIG. 1.

FIG. 1 is a cross section showing the construction of an automotive alternator according to Embodiment 1 of the present invention, FIG. 2 is a perspective of the stator of this automotive alternator, FIG. 3 is an end elevation explaining connections in one phase of stator winding group in this automotive alternator, FIG. 4 is a circuit diagram for this automotive alternator, and FIG. 5 is a partial cross section of the stator core in FIG. 1. Moreover, lead wires and bridging wires have been omitted from FIG. 2.

This alternator includes: a case 3 composed of an aluminum front bracket 1 and an aluminum rear bracket 2; a shaft 6 disposed within the case 3 having a pulley 4 secured to a first end thereof; a Lundell-type rotor 7 secured to the shaft 6; fans 5 secured to both axial end surfaces of the rotor 6; a stator 8 secured to an inner wall of the case 3; slip rings 9 secured to a second end of the shaft 6 for supplying electric current to the rotor 7; a pair of brushes 10 sliding on the slip rings 9; brush holders 11 accommodating the brushes 10; rectifiers 12 electrically connected to the stator 8 for converting alternating current generated in the stator 8 into direct current; a heat sink 17 fitted over the brush holder 11; and a regulator 18 fastened to the heat sink 17 by adhesive for adjusting the magnitude of the alternating voltage generated in the stator 8.

The rotor 7 includes a rotor coil 13 for generating magnetic flux on passage of electric current, and a pair of first and second pole cores 20 and 21 disposed so as to cover the rotor coil 13, magnetic poles being produced in the pair of pole cores 20 and 21 by the magnetic flux. The pair of pole cores 20 and 21 are made of iron and each has eight claw-shaped magnetic poles 22 and 23 secured to the shaft so as to be spaced at even pitch circumferentially around outer circumferential edges, facing each other so as to intermesh.

The stator 8 includes: a cylindrical stator core 15 composed of a laminated core formed with a number of slots 15a extending axially at a predetermined pitch in a circumferential direction; a stator winding 16 wound onto the stator core 15; and insulators 19 installed in each of the slots 15a for electrically insulating the stator winding 16 from the stator core 15. The stator core 15 includes a laminated inner circumferential core portion 85 and an outer circumferential core portion 86. A radial dimension of a core back of the inner circumferential core portion 85 is 1 mm, and a radial dimension of a core back of the outer circumferential core portion 86 is 2.6 mm.

The stator winding 16 includes a number of winding sub-portions in each of which one strand of wire 30 is bent back outside the slots 15a at end surfaces of the stator core 15 and wound into a wave winding so as to alternately occupy an inner layer and an outer layer in a slot depth direction within slots 15a a predetermined number of slots apart. In this case, the stator core 15 is formed with ninety-six slots 15a at even pitch so as to house two sets of three-phase stator winding 160 corresponds to the number of magnetic poles (sixteen) in the rotor 7. Long, insulated copper wire material having a rectangular cross section, for example, is used in the strands of wire 30.

Air intake vents 1a and 2a are formed in axial end surfaces of the front bracket 1 and the rear bracket 2, and air discharge vents 1b and 2b are disposed in two outer circumferential shoulder portions of the front bracket 1 and the rear bracket 2, opposite the radial outside of the front-end and rear-end coil end groups 16a and 1b of the stator winding 16.

One phase of winding group 161 is composed of first to fourth winding sub-portions 31 to 34 each formed from one strand of wire 30. The first winding sub-portion 31 is formed by wave winding one strand of wire 30 into every sixth slot from slot numbers 1 to 91 so as to alternately occupy a first position from an outer circumferential side and a second position from the outer circumferential side inside the slots 15a. The second winding sub-portion 32 is formed by wave winding a strand of wire 30 into every sixth slot from slot numbers 1 to 91 so as to alternately occupy the second position from the outer circumferential side and the first position from the outer circumferential side inside the slots 15a. The third winding sub-portion 33 is formed by wave winding a strand of wire 30 into every sixth slot from slot numbers 1 to 91 so as to alternately occupy a third position from the outer circumferential side and a fourth position from the outer circumferential side inside the slots 15a. The fourth winding sub-portion 34 is formed by wave winding a strand of wire 30 into every sixth slot from slot numbers 1 to 91 so as to alternately occupy the fourth position from the outer circumferential side and the third position from the outer circumferential side inside the slots 15a. The strands of wire 30 are arranged to line up in a row of four strands within each slot 15a with the longitudinal direction of their rectangular cross sections aligned in a radial direction.

At a first end of the stator core 15, a first end portion 31a of the first winding sub-portion 31 extending outwards from slot number 1 and a second end portion 33b of the third winding sub-portion 33 extending outwards from slot number 91 are joined, and in addition, a first end portion 33a of the third winding sub-portion 33 extending outwards from slot number 1 and a second end portion 31b of the first winding sub-portion 31 extending outwards from slot number 91 are joined to form two turns of winding.

At a second end of the stator core 15, a first end portion 32a of the second winding sub-portion 32 extending outwards from slot number 1 and a second end portion 34b of the fourth winding sub-portion 34 extending outwards from slot number 91 are joined, and in addition, a first end portion 34a of the fourth winding sub-portion 34 extending outwards from slot number 1 and a second end portion 32b of the second winding sub-portion 32 extending outwards from slot number 91 are joined to form two turns of winding.

In addition, a portion of the strand of wire 30 of the second winding subportion 32 extending outwards at the first end of the stator core 15 from slot numbers 61 and 67 is cut, and a portion of the strand of wire 30 of the first winding sub-portion 31 extending outwards at the first end of the stator core 15 from slot numbers 67 and 73 is also cut. A first cut end 31c of the first winding sub-portion 31 and a first cut end 32c of the second winding sub-portion 32 are joined to form one phase of winding group 161 having four turns connecting the first to fourth winding sub-portions 31 to 34 in series.

Moreover, the joint portion between the first cut end 31c of the first winding sub-portion 31 and the first cut end 32c of the second winding sub-portion 32 becomes a bridging connection connecting portion, and a second cut end 31d of the first winding sub-portion 31 and a second cut end 32d of the second winding sub-portion 32 become an lead wire (O) and a neutral-point lead wire (N), respectively.

A total of six phases of winding groups 161 are similarly formed by offsetting the slots 15a into which the strands of wire 30 are wound one slot at a time. Then, three phases each of the winding groups 161 are connected into star connections to form the two sets of three-phase stator winding 160, and each of the three-phase stator winding 160 is connected to its own rectifier 12. The rectifiers 12 are connected in parallel so that the direct-current output from each is combined.

In the automotive alternator constructed in this manner, electric current is supplied from a battery (not shown) through the brushes 10 and the slip rings 9 to the rotor coil 13, generating magnetic flux. The claw-shaped magnetic poles 22 of the first pole core 20 are magnetized with north-seeking (N) poles by this magnetic flux, and the claw-shaped magnetic poles 23 of the first pole core 21 are magnetized with south-seeking (S) poles. At the same time, rotational torque from the engine is transmitted through the belt and the pulley 4 to the shaft 6, rotating the rotor 7. Thus, a rotating magnetic field is applied to the stator winding 16, generating electromotive force in the stator winding 16. This alternating electromotive force passes through the rectifiers 12 and is converted into direct current, the magnitude of the current is adjusted by the regulator 18, and the battery is recharged.

At the rear end, external air is drawn in through the air intake vents 2a disposed opposite the heat sinks of the rectifiers 12 and the heat sink 17 of the regulator 18, respectively, by rotation of the fans 5, flowing along the axis of the shaft 6, cooling the rectifiers 12 and the regulator 18, and is then deflected centrifugally by the fans 5, cooling the rear-end coil end group 16b of the stator winding 16 before being expelled to the outside through the air discharge vents 2b. At the same time, at the front end, external air is drawn in axially through the air intake vents 1a by rotation of the fans 5, and is then deflected centrifugally by the fans 5, cooling the front-end coil end group 16a of the stator winding 16 before being expelled to the outside through the air discharge vents 1b.

Next, the method of manufacturing the stator 8 of the above construction will be explained.

Figure 6:
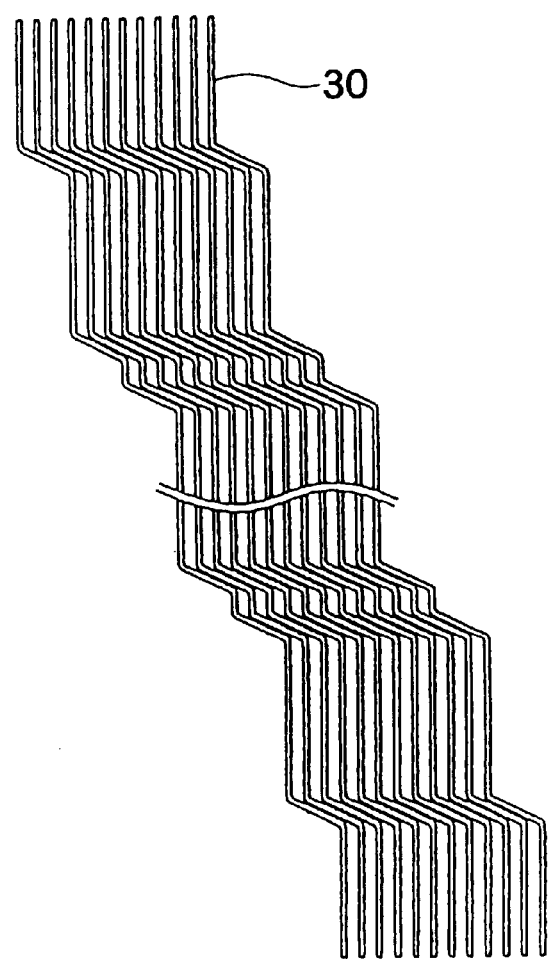
FIG. 6 is a diagram explaining the manufacturing process for winding groups constituting part of the stator winding used in the automotive alternator in FIG. 1.
Figure 7:
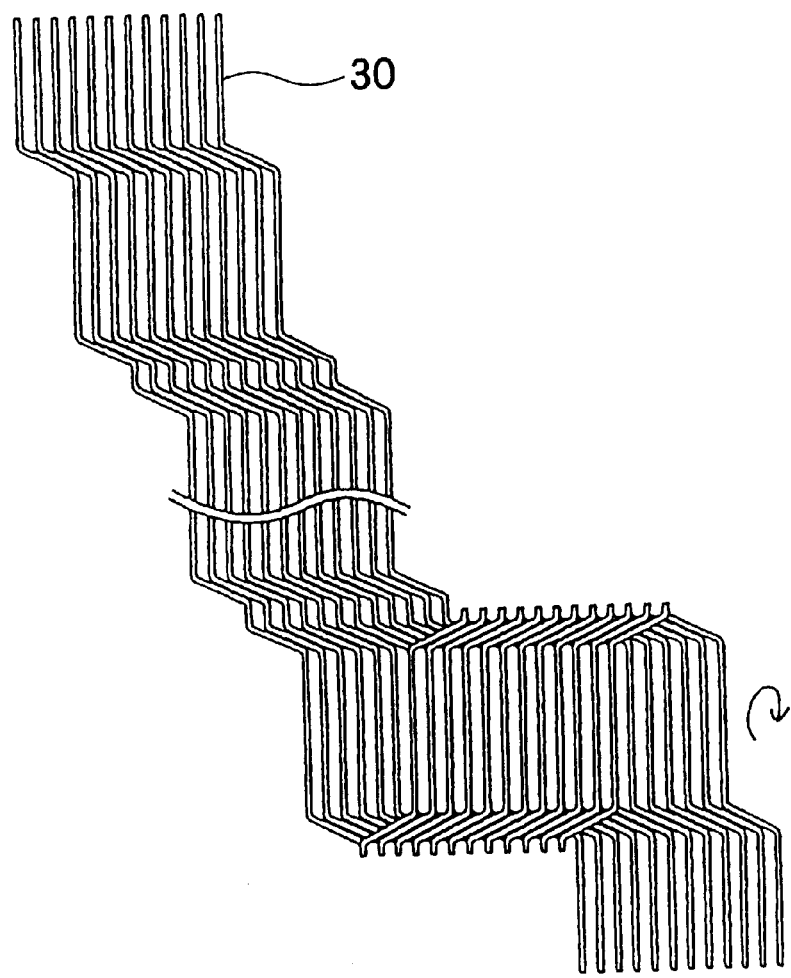
FIG. 7 is a diagram explaining the manufacturing process for winding groups constituting part of the stator winding used in the automotive alternator in FIG. 1.
Figure 8:
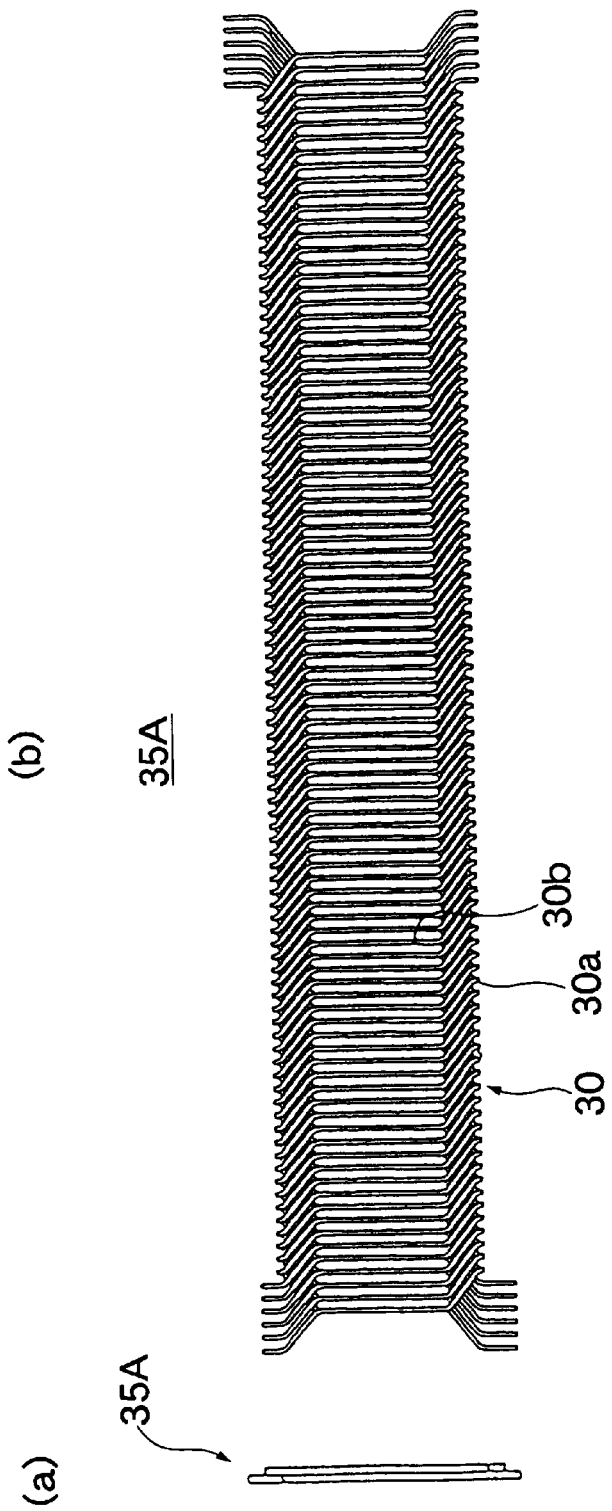
FIGS. 8(*a*) and 8(*b*) are an end elevation and a plan, respectively, showing an inner layer winding assembly constituting part of the stator winding used in the automotive alternator in FIG. 1.
Figure 9:
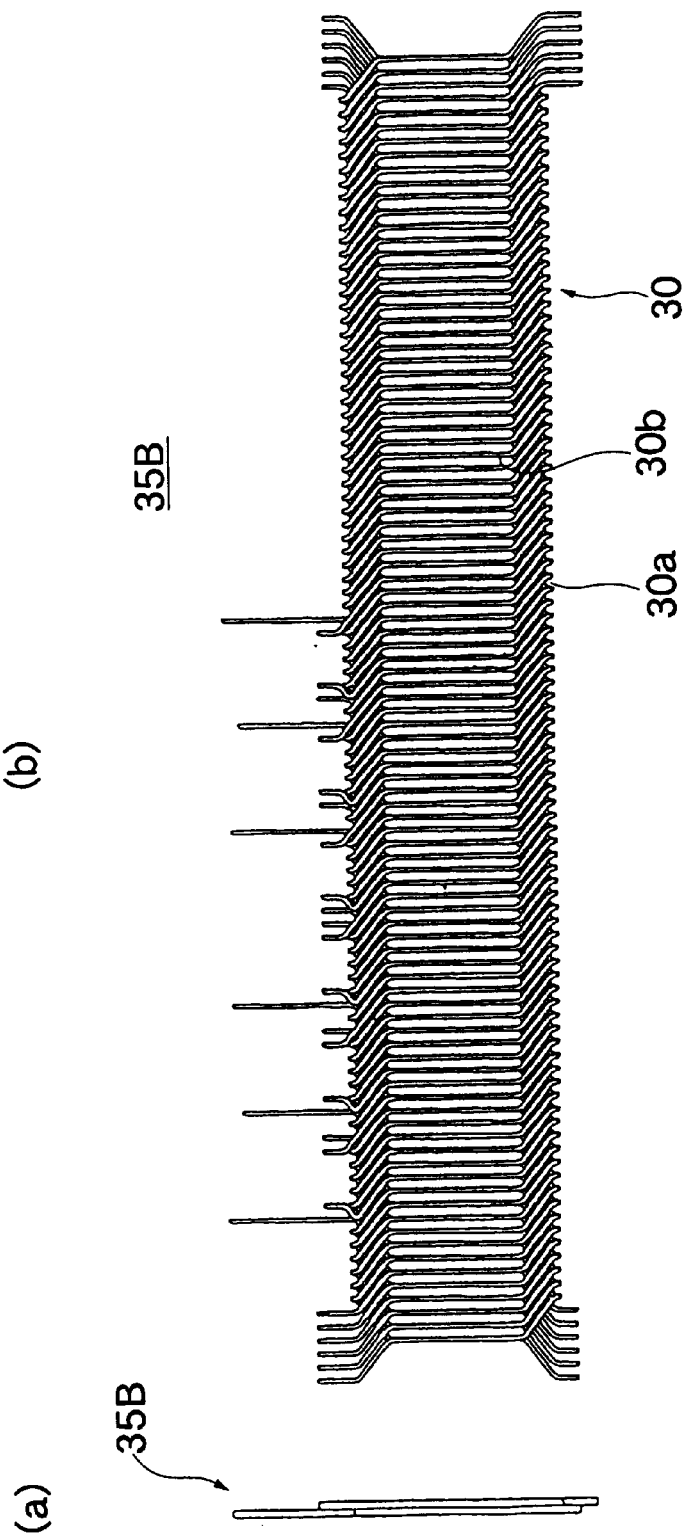
FIGS. 9(*a*) and 9(*b*) are an end elevation and a plan, respectively, showing an outer layer winding assembly constituting part of the stator winding used in the automotive alternator in FIG. 1.
Figure 10:
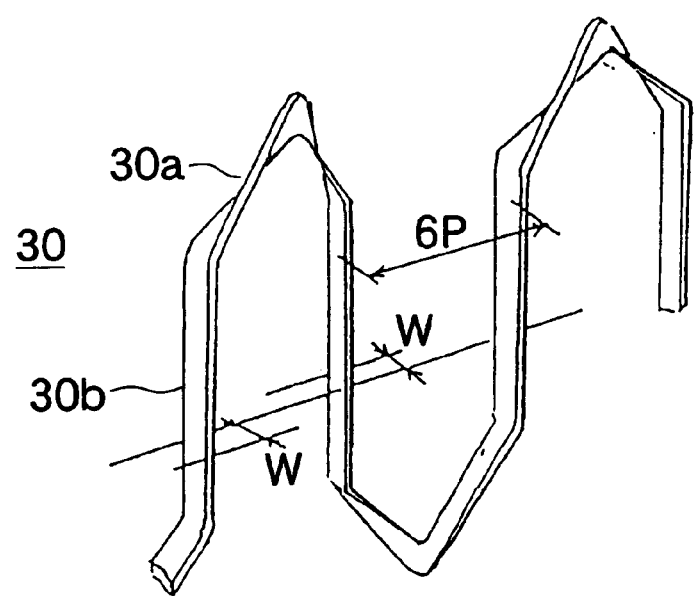
FIG. 10 is a perspective showing part of a strand of wire constituting part of the stator winding used in the automotive alternator in FIG. 1.
Figure 11:
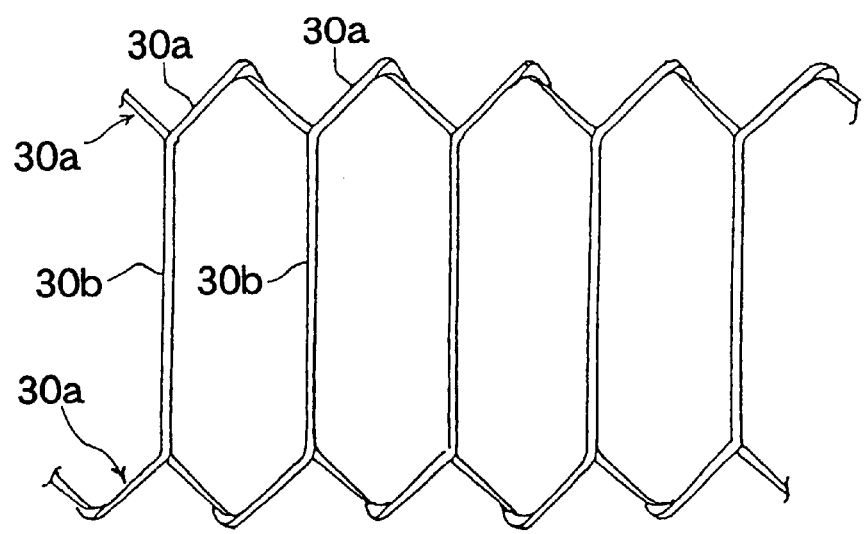
FIG. 11 is a diagram explaining arrangement of the strands of wire constituting part of the stator winding used in the automotive alternator in FIG. 1.

FIGS. 6 and 7 are diagrams explaining the manufacturing process for winding groups 161 constituting part of the stator winding 16. FIGS. 8(a) and 8(b) are diagrams showing an inner layer winding assembly constituting part of the stator winding 16 in FIG. 2, FIG. 8(a) being an end elevation and FIG. 8(b) being a plan. FIGS. 9(a) and 9(b) are diagrams showing an outer layer winding assembly constituting part of the stator winding 16 in FIG. 2, FIG. 9(a) being an end elevation and FIG. 9(b) being a plan. FIG. 10 is a perspective showing part of a strand of wire constituting part of the stator winding 16 in FIG. 2, and FIG. 11 is a diagram explaining arrangement of the strands of wire constituting part of the stator winding 16 in FIG. 2.

First, as shown in FIG. 6, twelve long strands of wire 30 are simultaneously bent in the same plane to form a lightning-bolt shape. Then, a winding assembly 35A, shown in FIGS. 8(a) and 8(b), is prepared by progressively folding the strand at right angles, as indicated by the arrow in FIG. 7, using a jig. In addition, a winding assembly 35B including bridging connections and lead wires, as shown in FIGS. 9(a) and 9(b), is prepared similarly.

Moreover, as shown in FIG. 10, each strand of wire 30 is formed by bending it into a planar pattern in which straight portions 30b connected by turn portions 30a are lined up at a pitch of six slots (6P). Adjacent straight portions 30b are offset radially by a distance equal to one width (W) of the strands of wire 30 by means of the turn portions 30a. The winding assemblies 35A and 35B are constructed by arranging six wire-strand pairs so as to be offset by a pitch of one slot from each other, each wire-strand pair consisting of two strands of wire 30 formed in the above pattern which are offset by a pitch of six slots and arranged such that straight portions 30b overlap as shown in FIG. 11. Six end portions of the strands of wire 30 each extend outwards from first and second sides at first and second ends of the winding assemblies 35A and 35B. Furthermore, the return portions 30a are arranged so as to line up in rows on first and second side portions of the winding assemblies 35A and 35B. The hardness of the winding assemblies 35A and 35B increases due to hardening by the bending process during shaping thereof. The winding assemblies 35A and 35B are heat softened for ten minutes at 300° C. to facilitate shaping in later steps.

Figure 12:
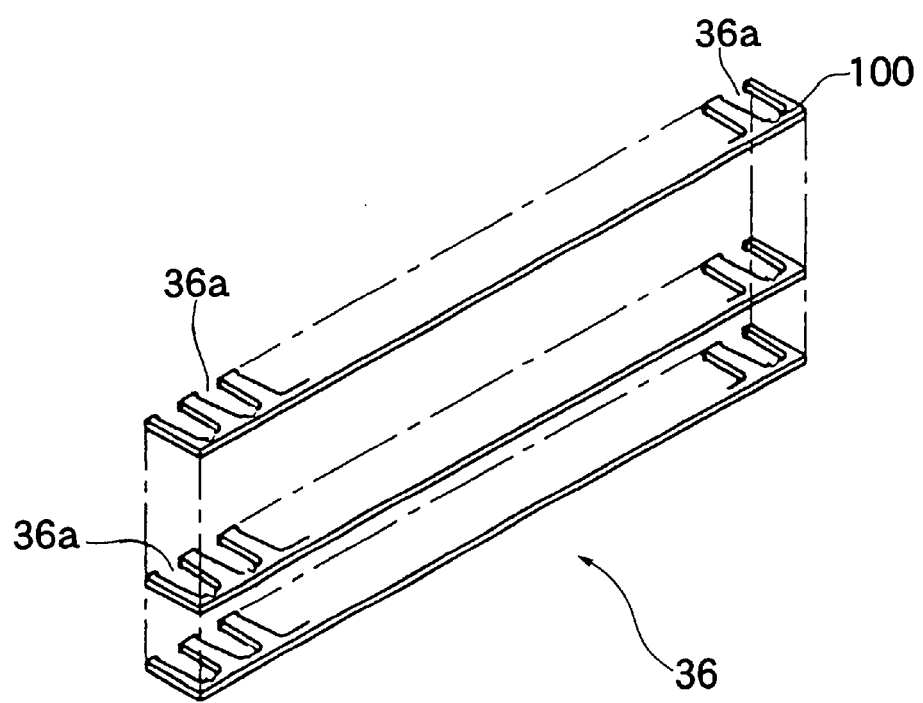
FIG. 12 is an exploded perspective of a base core.
Figure 13:
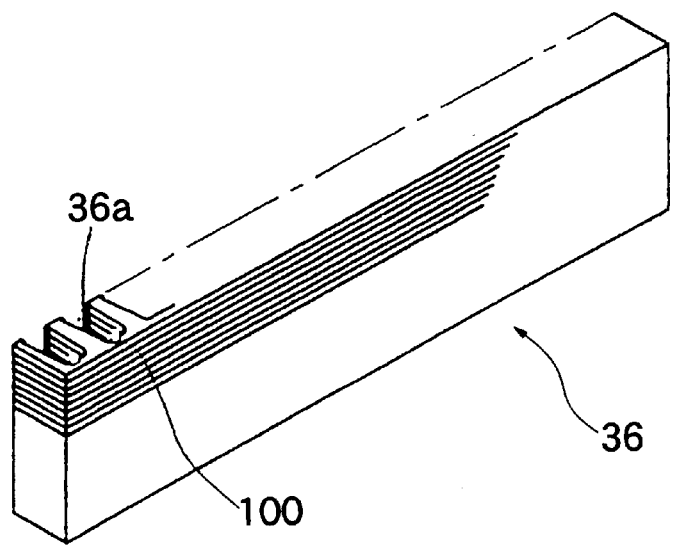
FIG. 13 is a perspective of the base core of the inner circumferential core portion in FIG. 5 before bending.
Figure 14:
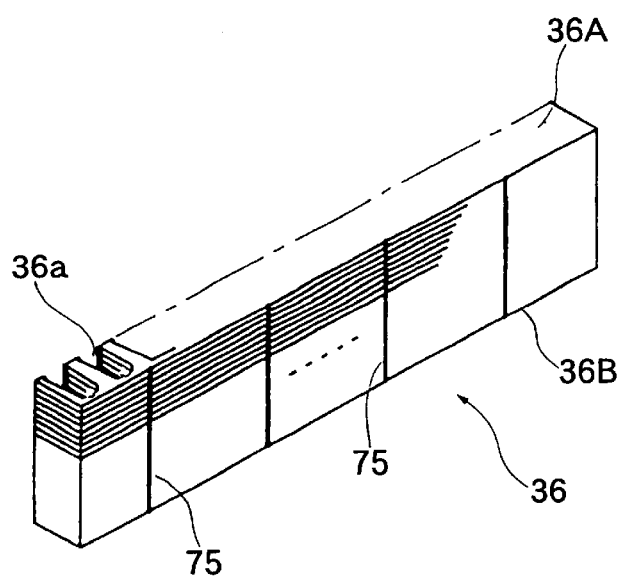
FIG. 14 is a diagram showing weld portions formed on the base core.

The parallelepiped base core 36 is prepared as shown in FIGS. 12 to 14 by laminating a predetermined number of sheets of SPCC material, which is a plate-shaped magnetic material, formed with trapezoidal slots 36a, widening towards the opening portions, as shown at a predetermined pitch (an electrical angle of 30°) and laser welding an outer portion thereof. Moreover, both axial end surfaces 36A and 36B of the base core are easily buckled as a result of warping of the SPCC material during bending of the base core 36, but in this embodiment, the many layers of SPCC material are firmly integrated by weld portions 75 extending axially at a number of locations, increasing the rigidity of the base core 36 and suppressing buckling. Moreover, these weld portions 75 do not have to be evenly spaced, and they may also be divided in the axial direction.

Figure 15:
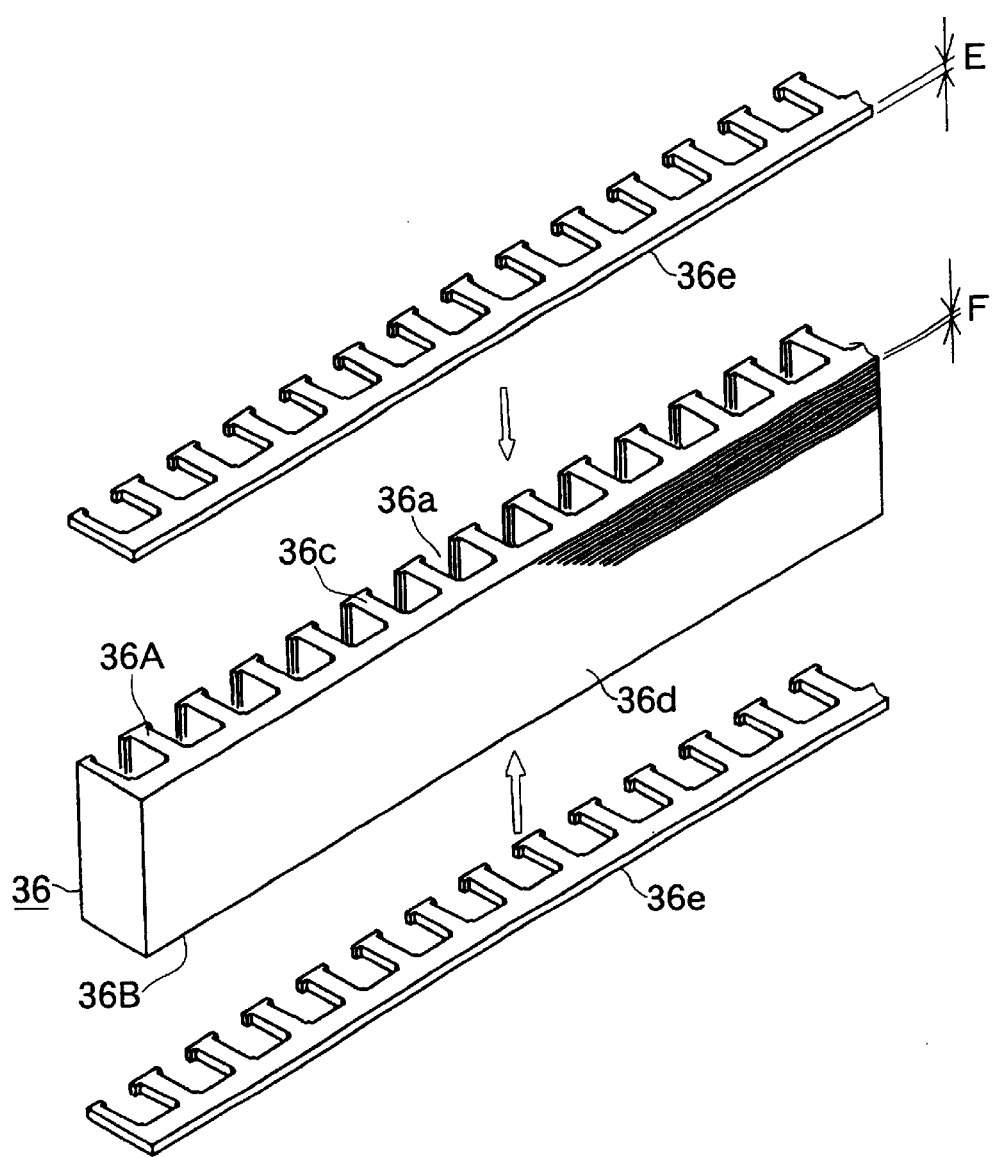
FIG. 15 is a perspective showing an example in which end plates are disposed on upside and underside of the base core.

Moreover, FIG. 15 is an example in which end plates 36e having higher rigidity than the SPCC material are disposed on first and second surfaces of the base core 36. The end plates 36e are the same shape as the SPCC material constituting the base core 36, and a thickness E of the end plates 36e is greater than a thickness T of the SPCC material, increasing rigidity. Buckling of the first and second surfaces 36A and 36B of the base core 36 as a result of warping of the SPCC material during bending of the base core 36 may be suppressed by disposing the highly-rigid end plates 36e on the first and second surfaces of the base core 36 as in this example.

Figure 16:
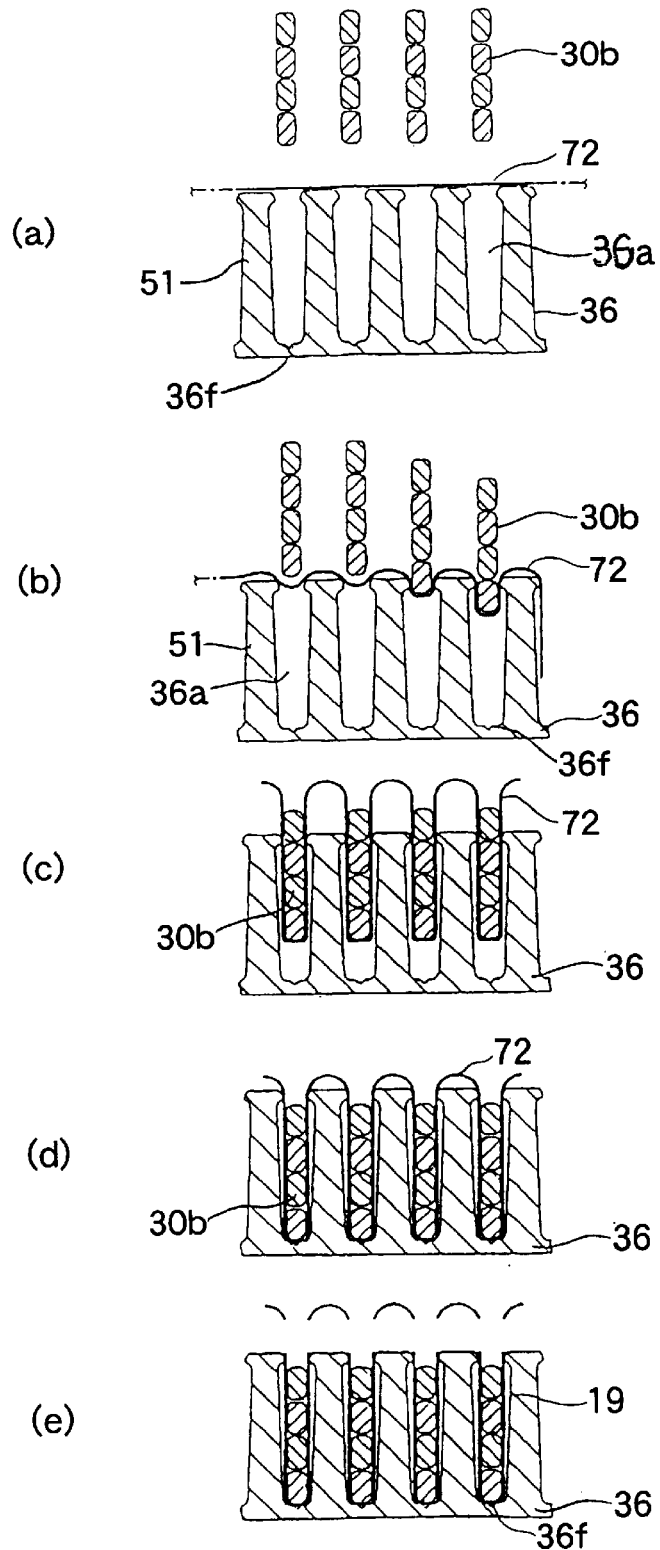
FIGS. 16(*a*), (*b*), (*c*), (*d*) and (*e*) are diagrams explaining steps of inserting the winding into the base core in FIG. 14.
Figure 17:
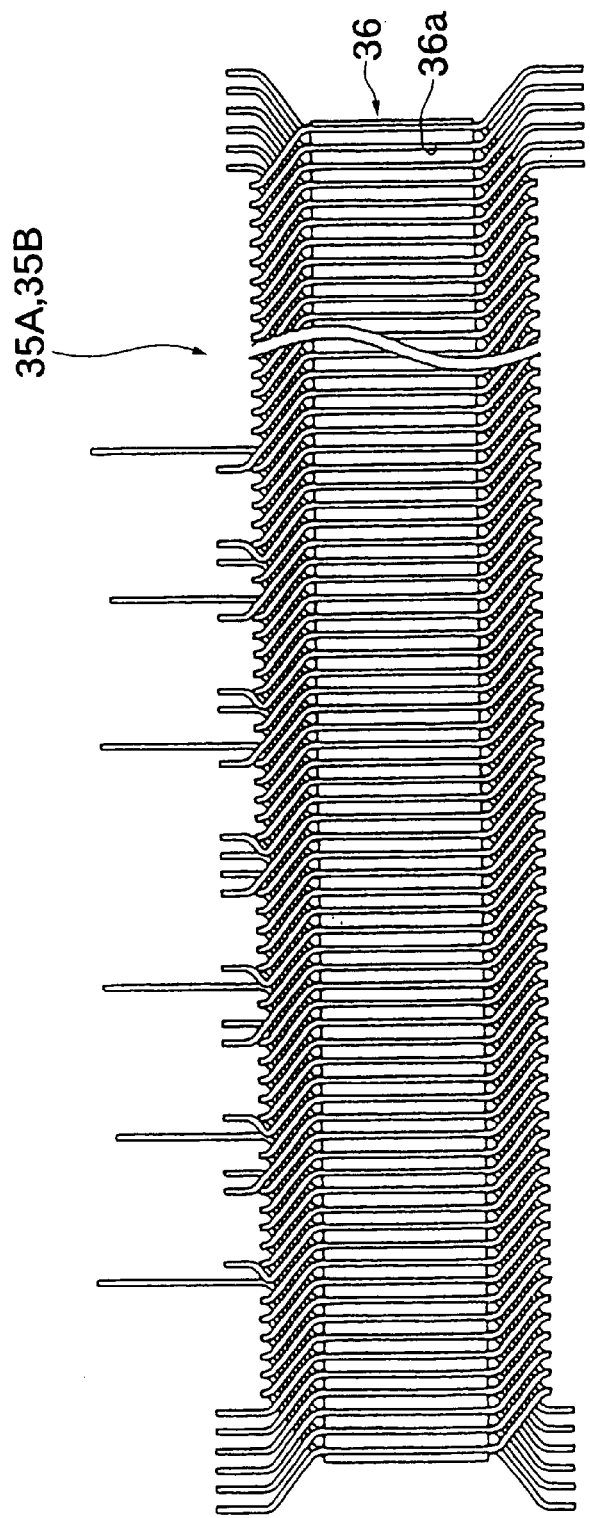
FIG. 17 is a plan showing a winding assembly constituting part of the stator winding in FIG. 1 installed in the base core.

As shown in FIG. 16(a), a strip of base insulators 72 is placed on top of the slots 36a of the base core 36, and then, as shown in FIGS. 16(b) to 16(d), the straight portions 30b of the two winding assemblies 35A and 35B are inserted into each of the slots 36a. After this insertion, joining portions 72a of the base insulators 72 between the slots 36a are cut, thus forming the insulators 19, and then the straight portions 30b of the two winding assemblies 35A and 35B are housed such that four of the straight portions 30b line up within each of the slots 36a and are insulated from the base core 36 by the insulators 19. FIG. 17 shows a plan of the whole stator core at this stage.

Figure 19:
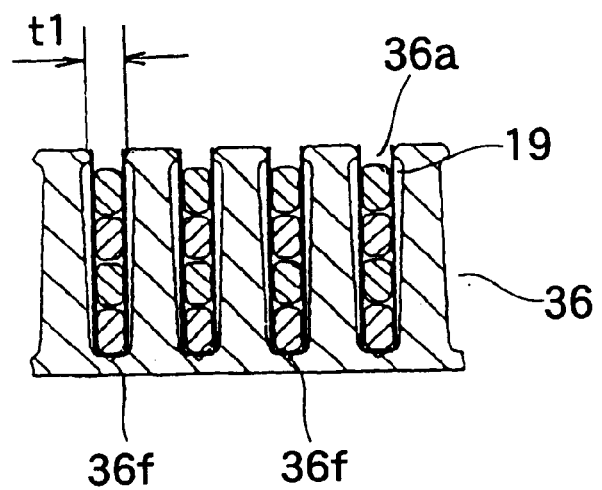
FIG. 19 is a partial enlargement of FIG. 18(a).
Figure 20:
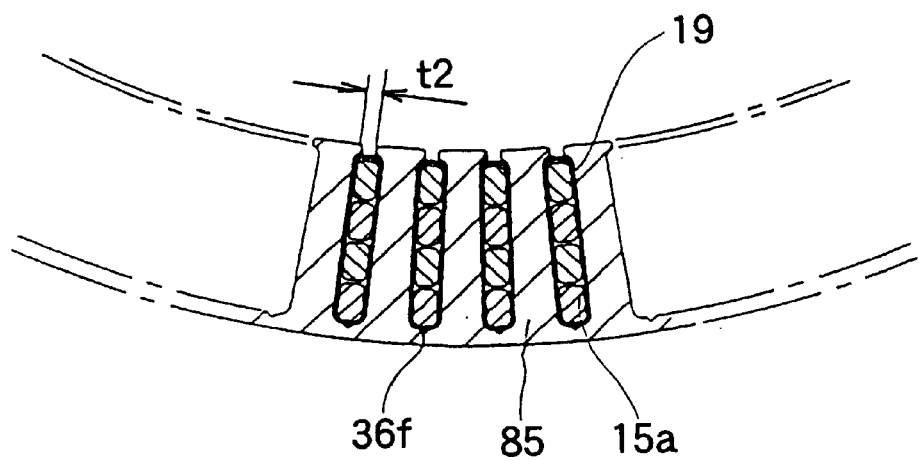
FIG. 20 is a partial enlargement of FIG. 18(c).

Next, as shown in FIGS. 18(a) and (b), the parallelepiped base core 36 with the winding assemblies 35A and 35B inserted is rolled up into a cylindrical shape, and its ends abutted and welded to each other to form an abutting portion 77, to obtain the cylindrical inner circumferential core portion 85 of the stator core 15, as shown in FIG. 18(c). As shown in FIGS. 19 and 20, a width t2 of the opening portions 15b of the slots 15a of the inner circumferential core portion 85 is smaller than a width t1 of the opening portions of the slots 36a of the parallelepiped base core 36. Moreover, because the base core 36 is prepared by first bending the end portions thereof only before bending the rest of the parallelepiped base core 36, as shown in FIG. 18(b), when the ends of the base core 36 are abutted, an inner circumferential core portion 85 is provided which has good roundness even at the abutting portion 77. Furthermore, notched portions 100 are formed in core back portions of each of the slots 36a to facilitate the rolling up of the parallelepiped base core 36 into the cylindrical shape. Moreover, these gaps close up during rolling into the cylindrical shape.

Figure 21:
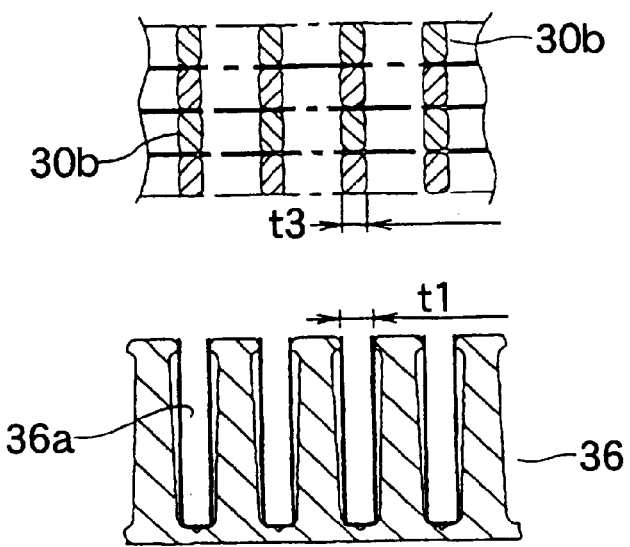
FIG. 21 is a diagram showing the relationship between the width of the strands of wire and the width of opening portions of the slots of the base core.

Since the slots 36a of the base core 36 are trapezoidal, widening towards the opening portions as shown in FIG. 21, and the width t1 of the opening portions is greater than the circumferential width dimensions t3 of the straight portions 30b of the two winding assemblies 35A and 35B, the straight portions 30b do not interfere with the tooth ends and can be inserted smoothly. Furthermore, because circumferential width dimensions of the slots 15a of the stator core 15 (which are also the slots 15a of the inner circumferential core portion 85) are generally the same as the circumferential dimensions of the straight portions 30b, the teeth 51 and straight portions 30b are prevented from pressing on and deforming each other during bending of the base core 36.

Figure 22:
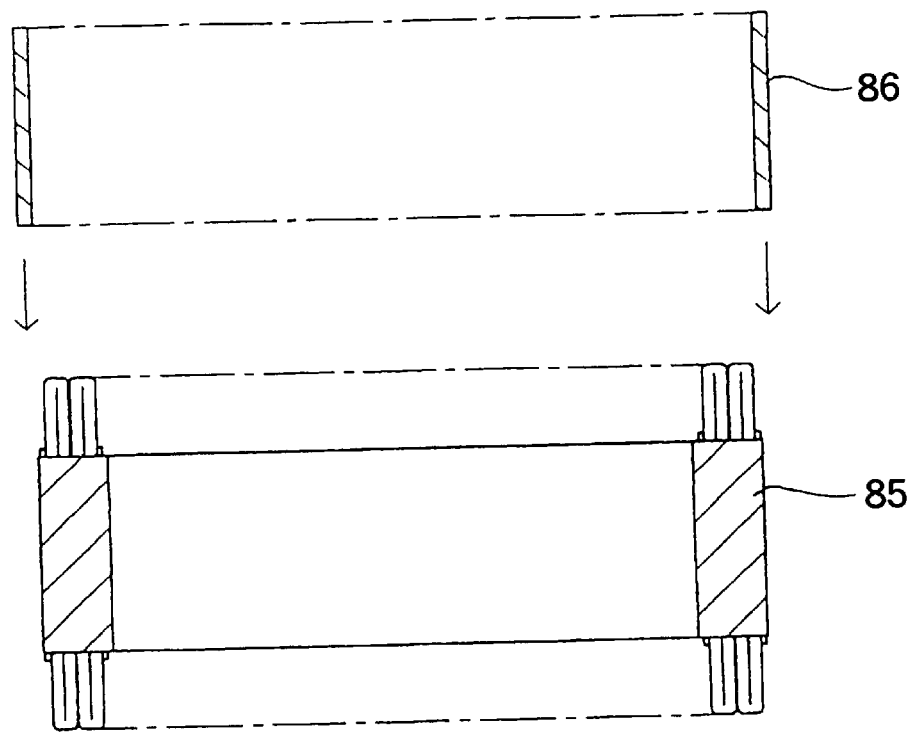
FIG. 22 is a diagram showing an outer circumferential core portion being fitted over the inner circumferential core portion in FIG. 5.
Figure 23:
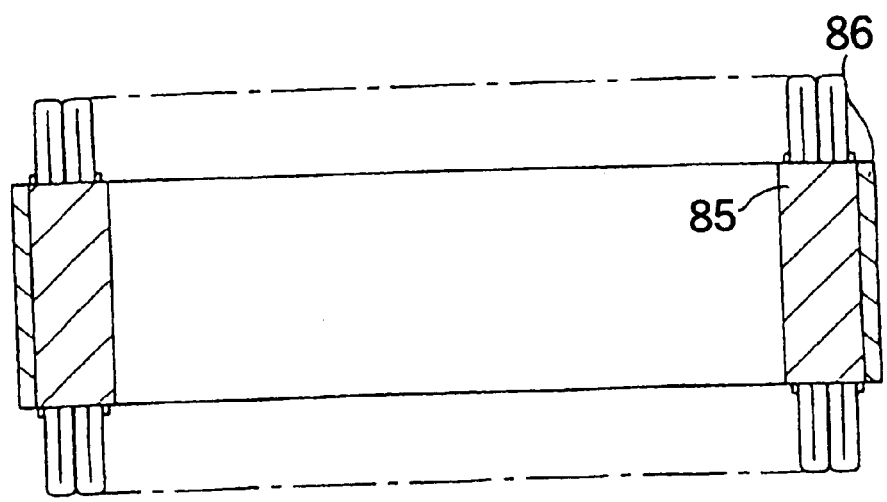
FIG. 23 is a diagram showing the outer circumferential core portion when fitted over the inner circumferential core portion.

The rigidity of the stator core 15 is increased by press fitting the inner circumferential core portion 85 into the outer circumferential core portion 86 as shown in FIGS. 22 and 23. In this case, before the inner circumferential core portion 85 is inserted into the outer circumferential core portion 86, outside diameter dimensions of the inner circumferential core portion 85 are slightly larger than inside diameter dimensions of the outer circumferential core portion 86 (at this point there is an air gap in the abutting portion 77) so that the shape of the inner circumferential core portion 85 is restricted by the outer circumferential core portion 86 during press fitting of the outer circumferential core portion 86, enabling the degree of roundness of the inner circumferential core portion 85 to be increased.

Thereafter, the manufacturing of the stator 8 is completed by connecting the end portions of the strands of wire 30 to form the stator winding 16 based on the connections shown in FIG. 3.

Figure 24:
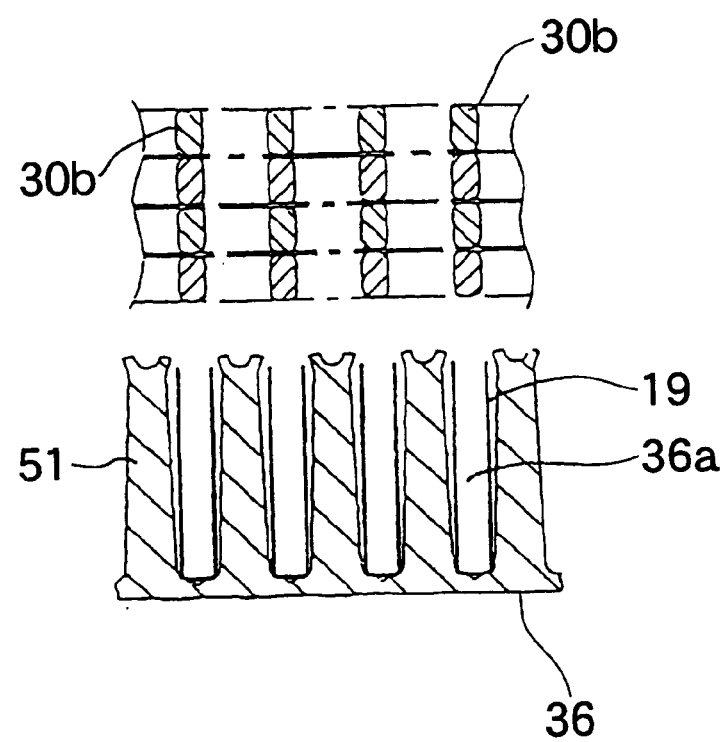
FIG. 24 is a diagram showing a variation of the base core.
Figure 25:
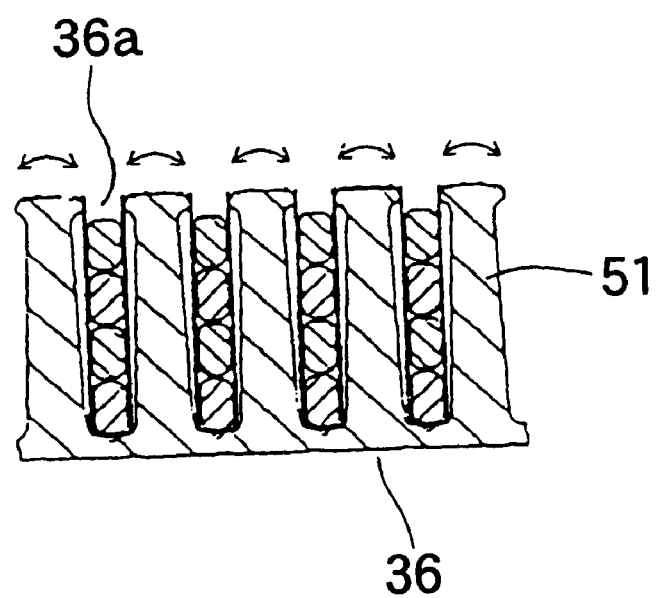
FIG. 25 is a diagram showing end portions of teeth of the base core in FIG. 24 after plastic deformation.

As shown in FIGS. 24 and 25, end portions of the teeth 51 defining the slots 36a of the base core 36 may also be pressed and plastically deformed after integration of the base core 36 and the winding assemblies 35A and 35B to reduce the width dimensions of the opening portions 36b of the slots 36.

In the above automotive alternator, the operation of assembling the stator 8 is greatly improved compared to the conventional art, in which a large number of conductor segments 305 are inserted into the slots one at a time, by rolling the parallelepiped base core 36 into a cylindrical shape with the straight portions 30b of the two flat winding assemblies 35A and 35B housed in the slots 36a of the base core 36, and abutting the ends of the base core 36 and welding them to each other.

Because the winding assemblies 35A and 35B are wound so as to alternately occupy inner and outer layers in a slot depth direction in every sixth slot, turn portions of the coil ends are arranged neatly in rows so as not to interfere with each other, eliminating interference and short-circuiting between the strands of wire even when the parallelepiped base core is rolled up into the cylindrical shape.

Because heat softening treatment is applied to the winding assemblies 35A and 35B in a wound state as described above, a large bending force is not required when rolling the base core 36 into the cylindrical shape, facilitating shaping. By adopting the manufacturing process in which the winding assemblies 35A and 35B are pressed into the slots 15a in a slot depth direction while the base core 36 is in the parallelepiped state, then rolling up the base 36, the opening portions of the slots of the base core 36 are wider than the width of the strands of wire 30 during insertion and narrower after formation of the cylindrical shape, whereby insertion of the winding is improved and the winding is prevented from protruding into the radial inside of the stator 8.

By pressing and plastically deforming the end portions of the teeth 51 to further reduce the width dimensions of the opening portions 36b of the slots 36a, output is improved and wind noise due to interference is reduced.

Because the first to fourth winding sub-portions 31 to 34 constituting the stator winding 16 are each composed of one strand of wire 30 (continuous wire), it is not necessary to insert a large number of short conductor segments 305 into the stator core 301 and join end portions 305b to each other by welding, soldering, etc., as was required in the conventional stator 300, enabling the productivity of the stator 8 to be improved significantly.

Furthermore, the following effects on the performance of the alternator are also achieved.

Because the coil ends are constituted by the return portions 30a of the strands of wire 30, the only joints in the coil end groups 16a and 16b are the first and second end portions of the first to fourth winding sub-portions 31 to 34 and the bridging connection joint portions, significantly reducing the number of joints. Thus, because the occurrence of short-circuiting accidents which accompany loss of insulation due to the joining process can be suppressed, superior insulation can be achieved. Furthermore, the conductors are not softened by welding, raising the rigidity of the stator as a whole and enabling magnetic noise to be reduced.

The coil end groups 16a and 16b are constructed by arranging the return portions 30a neatly in rows circumferentially so as not to interfere with each other. Thus, compared to the conventional return portions in which the end portions 305b of the conductor segments 305 were joined to each other, the height to which the return portions extend outwards from the stator core 15 can be reduced. Thus, wind resistance in the coil end groups 16a and 16b is reduced, enabling the reduction of wind noise due to the rotation of the rotor 7. Leakage reactance from the strands of wire in the coil ends is also reduced, improving output and efficiency.

Four strands of wire 30 are arranged so as to line up in a row radially within each slot 15a, and the return portions 30a are arranged to line up in two rows circumferentially. Thus, the return portions 30a constituting the coil end groups 16a and 16b are each divided into two rows radially, enabling the height to which the coil end groups 16a and 16b extend outwards from the stator core 15 to be reduced. As a result, wind resistance in the coil end groups 16a and 16b is reduced, enabling the reduction of wind noise due to the rotation of the rotor 7.

Because the straight portions 30b of the strands of wire 30 are formed with a rectangular cross section, the cross-sectional shape of the straight portions 30b fits neatly into the shape of the slots 15a when the straight portions 30b are housed inside the slots 15a. Thus, the insertion of the stator winding 16 into the stator core 15 is improved and the space factor of the strands of wire 30 inside the slots 15a is easily increased, enabling suppressed value of resistance of the stator winding 16, improved transfer of heat from the strands of wire 30 to the stator core 15, temperature increase in the stator winding 16 is suppressed.

Moreover, in Embodiment 1, the inner circumferential core portion and the outer circumferential core portion may be integrated by shrink fitting. Furthermore, the outer circumferential core portion may be a pipe shape, or have a laminated construction in which a plate-shaped magnetic member is wound into a helical shape.

Embodiment 2

Figure 26:
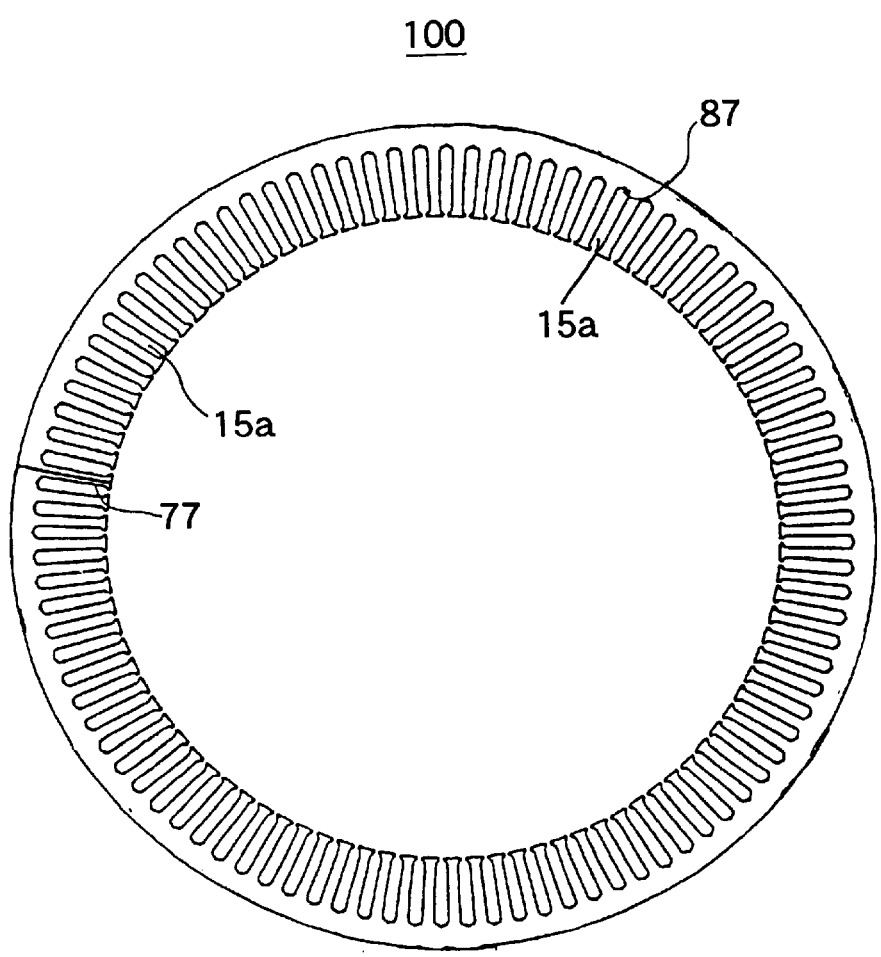
FIG. 26 is a cross section of stator core used in an automotive alternator according to Embodiment 2 of the present invention.

FIG. 26 is a cross section of stator core 100 according to Embodiment 2 of the present invention. In Embodiment 1, the stator core 15 was constituted by two members: the inner circumferential core portion 85 and the outer circumferential core portion 86, but in this Embodiment 2, the stator core 100 is constituted by one member. Whereas the radial dimension of the core back of the inner circumferential core portion 85 was 1 mm, and the radial dimension of the core back of the outer circumferential core portion 86 was 2.6 mm in Embodiment 1, a radial dimension of the core back of this stator core 100 is 3.6 mm, increasing thickness and rigidity, which necessitates a large force for the process of bending the core into a cylindrical shape, but the bending process is facilitated by forming notched portions 87 in floor surfaces of the slots of the base core. Furthermore, the step of press fitting the outer circumferential core portion over the inner circumferential core portion described in Embodiment 1 is eliminated.

Embodiment 3

Figure 27:
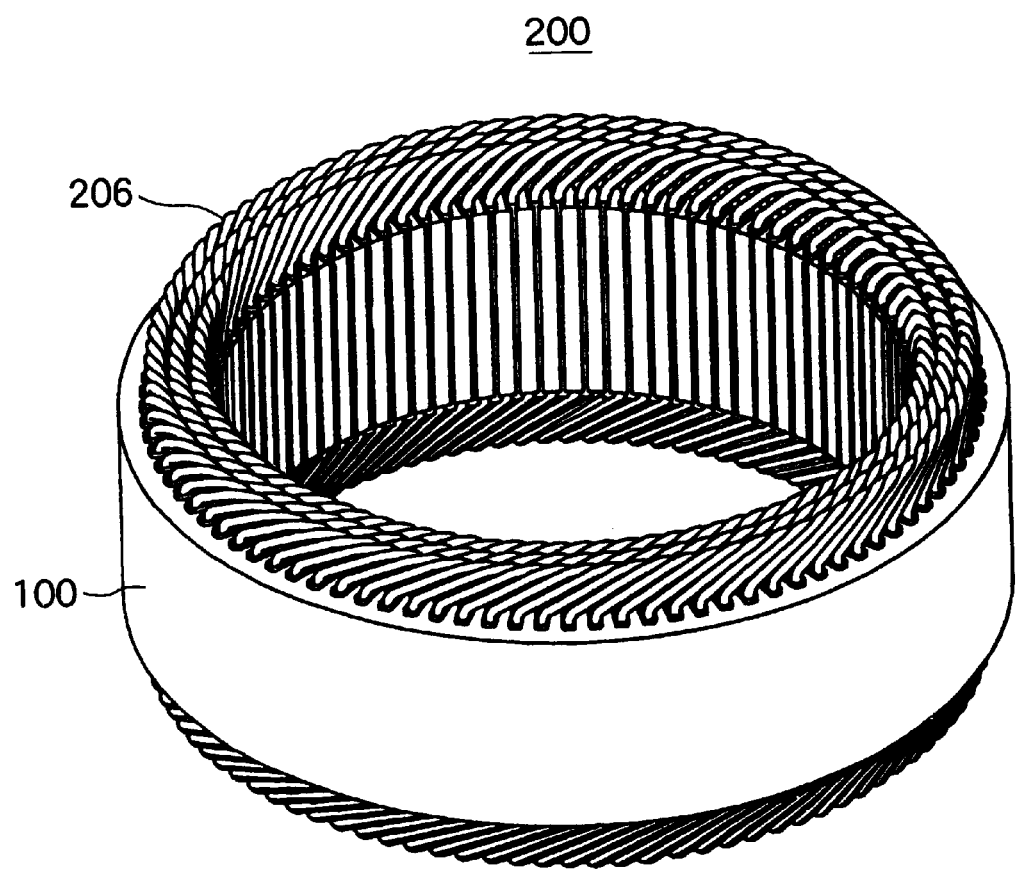
FIG. 27 is a perspective of a stator used in a automotive alternator according to Embodiment 3 of the present invention.
Figure 28:
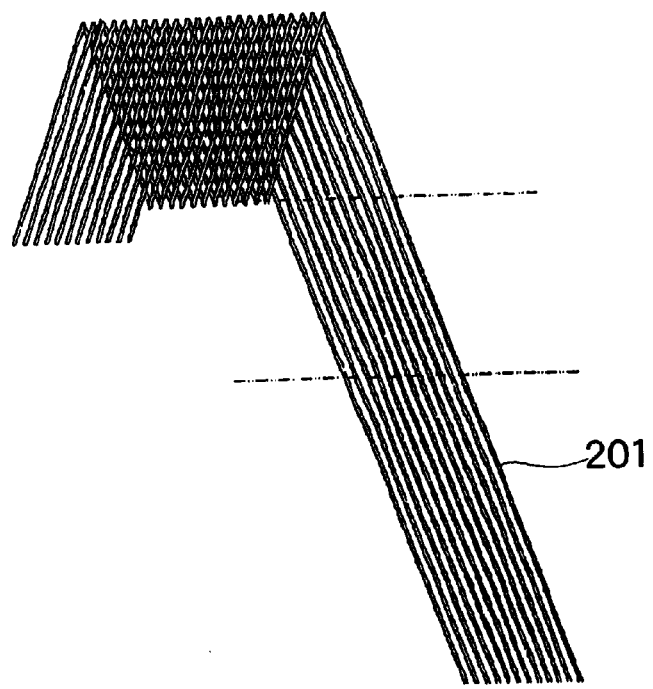
FIG. 28 is a diagram explaining a method for manufacturing a stator winding in the stator in FIG. 27.
Figure 29:
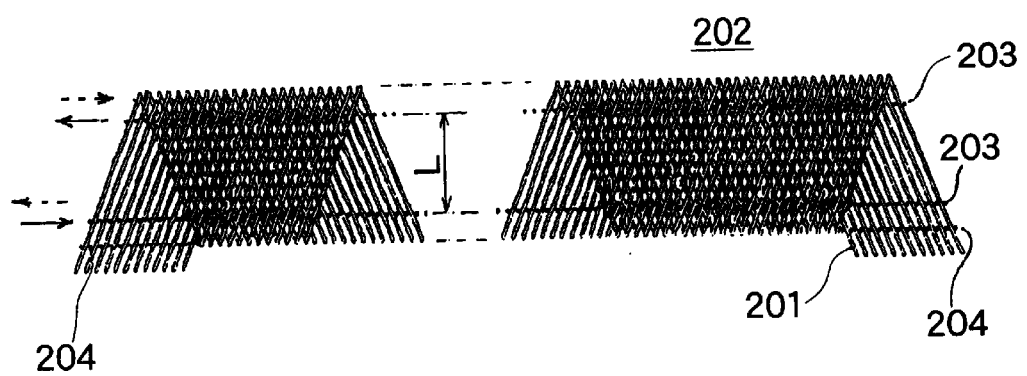
FIG. 29 is a diagram explaining the method for manufacturing the stator winding in the stator in FIG. 27.
Figure 30:
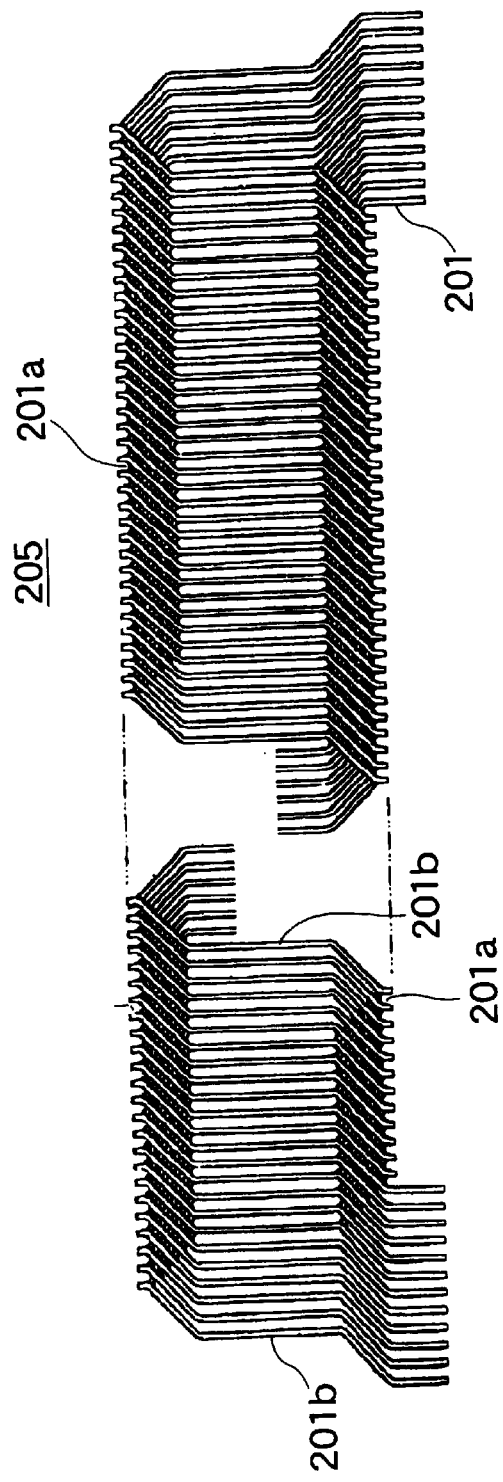
FIG. 30 is an elevation view of a winding assembly during manufacture of the stator winding of the stator in FIG. 27.

FIG. 27 is a perspective of a stator 200 according to Embodiment 3 of the present invention, FIGS. 28 and 29 are diagrams explaining a method for manufacturing a stator winding in the stator 200, and FIG. 30 is an end elevation of a winding assembly 205 of the stator winding of the stator 200 during manufacture.

In Embodiment 3, in a stator winding 206 wound into the stator core 100, a winding assembly 205 having two layers is formed by connecting a first winding sub-portion in which a strand of wire 201 having a circular cross section forms one turn occupying an inner layer and an outer layer in a slot depth direction of slots 207a separated by a predetermined pitch and a second winding sub-portion which is reverse wound and offset by an electrical angle of 180° to the first winding sub-portion. Three winding assemblies 205 are inserted into the stator core 100 and each of the winding assemblies 205 are connected to form six layers, forming a three-phase stator winding having two slots 207a per pole per phase in which each phase portion has a phase difference corresponding to an electrical angle of 120°.

Next, the method for manufacturing each of the above winding assemblies 205 will be explained. First, twelve strands of wire 201 are lined up in a plane at a pitch of one slot. Then, as shown in FIG. 28, the twelve strands of wire 201 are folded over together at a predetermined pitch (at the positions of the double-dotted chain lines), forming a strip-shaped winding unit 202 in which the twelve strands of wire 201 are bent into a helical shape.

A number of pairs of pins 203 are inserted between the strands of wire 201 from a front side of the winding unit 202 at positions separated by a distance L relative to a width direction of the winding unit 202. Similarly, a number of pairs of the pins 203 are inserted between the strands of wire 201 from a rear side of the winding unit 202 at positions separated by a distance L in a width direction of the winding unit 202. In addition, position-regulating pins 204 are inserted between the strands of wire 201 at end portions in a width direction of the winding unit 202. Thus, the pins 203 and 204 are set as shown in FIG. 29. Here, the distance L generally matches an axial length of the slots 207a (an axial dimension of the stator 200).

Then, the pairs of pins 203 which are inserted between the strands of wire 201 from the front side of the winding unit 202 are moved in mutually opposite directions in a longitudinal direction of the winding unit 202, as indicated by the solid arrows in FIG. 29.

Similarly, the pairs of pins 203 which are inserted between the strands of wire 201 from the rear side of the winding sub-portions 202 are moved in mutually opposite directions in a longitudinal direction of the winding unit 202, as indicated by the broken arrows in FIG. 29. At this time, the strands of wire 201 are prevented from coming apart because the position-regulating pins 204 are inserted between the strands of wire 201.

Thus, the portions of the strands of wire 201 positioned between the pairs of pins 203 are deformed so as to become perpendicular to the longitudinal direction of the winding unit 202, becoming straight portions 201b to be housed inside the slots 207a. The portions of the strands of wire 201 positioned on a first and second outer side of the pairs of pins 203 become return portions 201a which link straight portions 201b six slots apart. Thus, the winding assembly 205 shown in FIG. 30 is prepared.

The rest of the manufacturing process of the stator 200 is the same as in Embodiments 1 and 2, and explanation thereof will be omitted.

Figure 31:
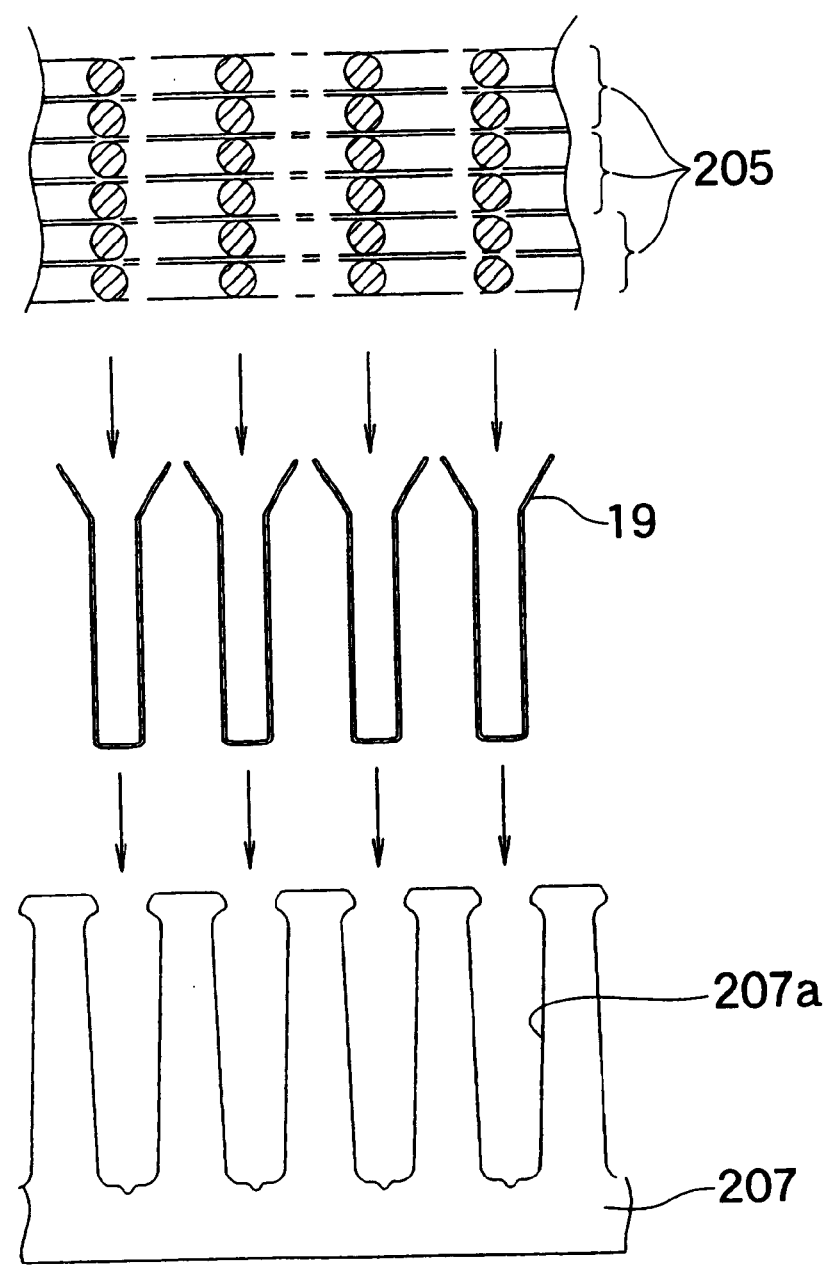
FIG. 31 is a diagram showing the winding assembly being inserted into a base core.
Figure 32:
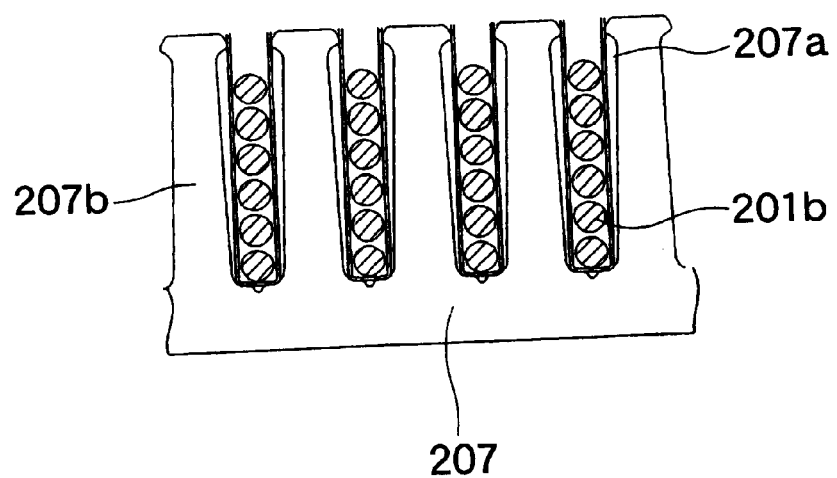
FIG. 32 is a partial cross section of the winding assembly when inserted into the base core.
Figure 33:
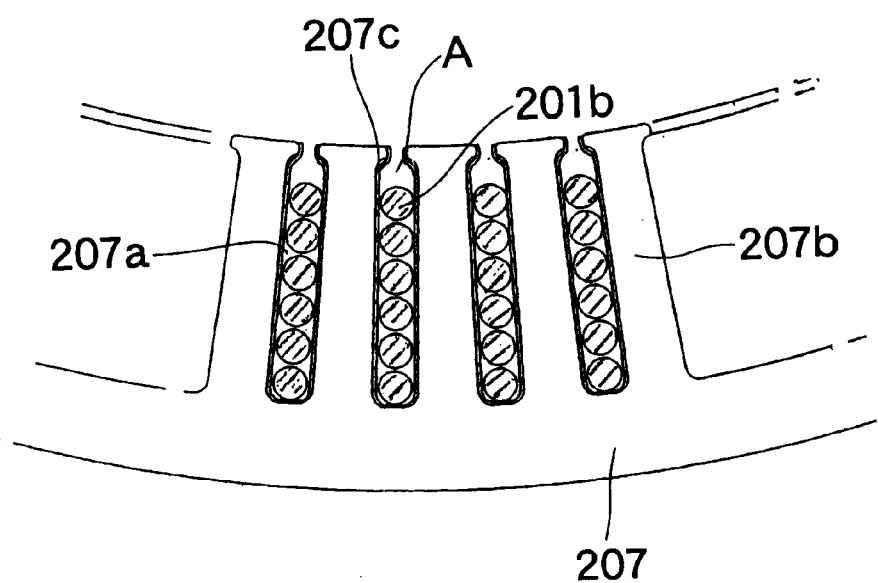
FIG. 33 is a partial cross section of the winding assembly inserted into a stator core.
Figure 34:
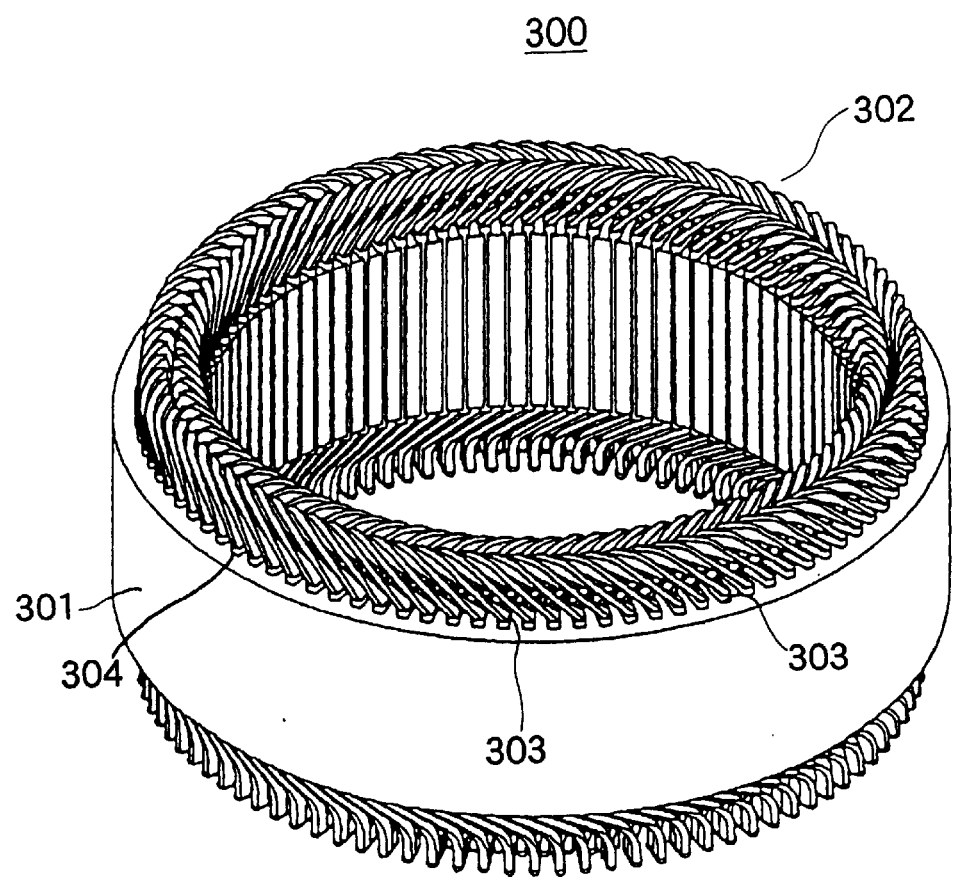
FIG. 34 is a perspective of a stator of a conventional automotive alternator.
Figure 35:
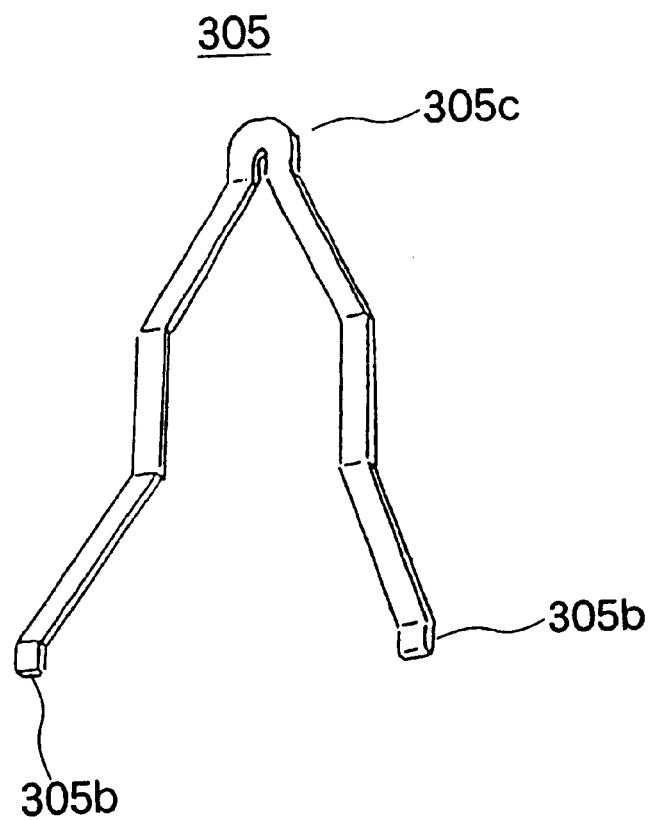
FIG. 35 is a perspective showing a conductor segment used in the stator in FIG. 34.
Figure 36:
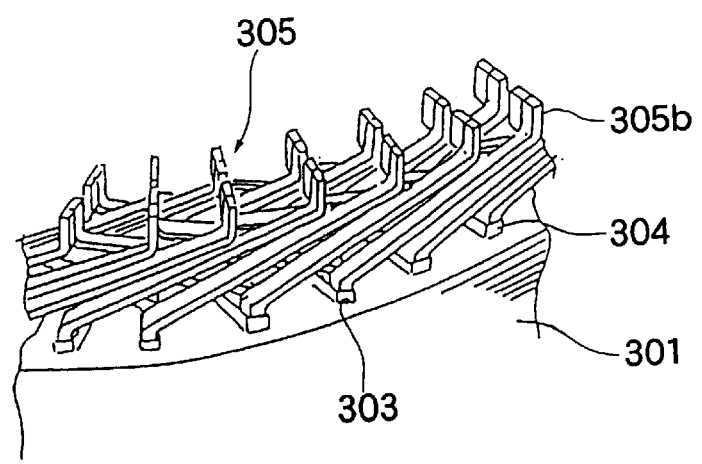
FIG. 36 is a perspective from a front end of part of the stator in FIG. 34.
Figure 37:
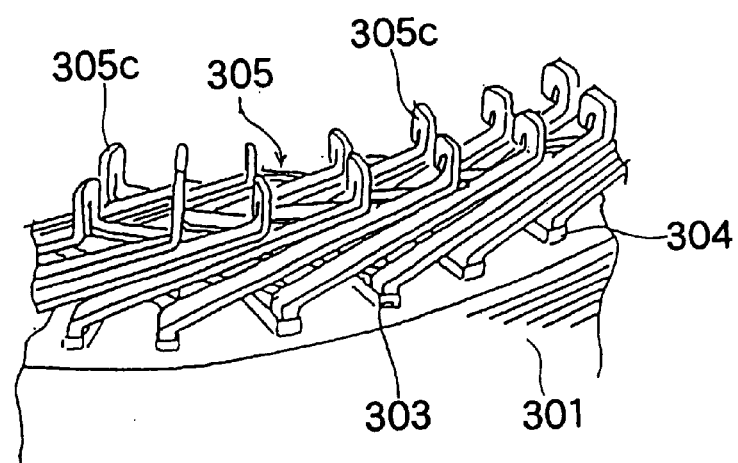
FIG. 37 is a perspective from a rear end of part of the stator in FIG. 34.
Figure 38:
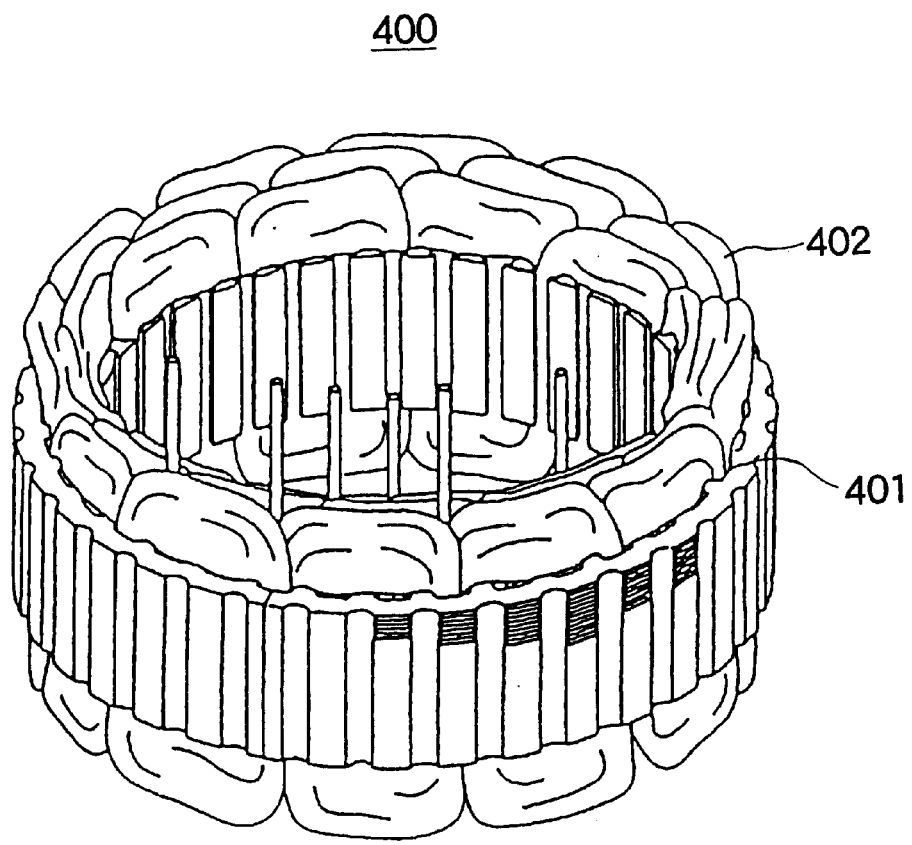
FIG. 38 is a perspective showing another example of a stator of a conventional automotive alternator.

In Embodiment 3, as shown in FIGS. 31 to 33, the straight portions 201b of the three winding assemblies 205 are inserted into the slots 207a, and six straight portions 201 are housed in a row inside each of the slots 207a so as to be electrically insulated from a base core 207 by an insulator 19.

The straight portions 201b come into contact with a bottom surface of the slots 207a, and there is a gap A between shoulder portions 207c of end portions of teeth 207b.

In Embodiment 3, because the cross section of the strands of wire 201 inserted into the slots 207a is a generally circular shape, the strands of wire 201 are easily deformed by bending, making it easy to form the winding assembly 205. When the cross section of the strands of wire is rectangular in shape, if there is a twist in the straight portions, insulation defects occur in the strands of wire due to damage to an insulation coating caused by the straight portions coming into contact with the end portions of the teeth while being inserted into the slots, but in the strands of wire 201 in this Embodiment 3, the frequency of damage to the insulation coating due to contact by the strands of wire 201 during manufacture is reduced, reducing quality control man-hours.

When the cross section of the strands of wire is rectangular in shape, apex portions of the return portions of the winding assembly stretch locally and the insulation coating peels off during formation of the winding assembly, giving rise to insulation defects and causing corrosion to begin in those portions, but by making the cross section of the strands of wire 201 a circular shape, the frequency at which the coating peels off is reduced, improving insulation of the strands of wire 201.

When the cross section of the strands of wire is rectangular in shape, end portions of the strands of wire come into contact with each other when the end portions are connected together to form the stator winding, and the return portions of the strands of wire come into contact with each other due to vibrations, etc., when the alternator is in operation, causing the insulation coating to peel off and giving rise to insulation defects, but because the cross section of the strands of wire 201 is circular in shape and has no corner portions, the frequency of peeling of the coating is reduced, improving insulation of the strands of wire 201.

When connecting the end portions of the strands of wire to each other, it is necessary to strip the insulation coating off, but in that case, when the cross section of the strands of wire is rectangular in shape, one problem has been that man-hours were increased because a separate process is needed to strip the coating off each of the four surfaces, or a process for forming a circular cross section then stripping the coating off, but by making the cross section of the strands of wire 201 circular in shape to begin with such processes are not needed, and mechanical stripping of the insulation coating is simplified.

When the cross section of the strands of wire is rectangular in shape, wind-splitting noise occurs at edges of the strands of wire when cooling air passes between the return portions, but by making the cross section of the strands of wire 201 circular in shape, the cooling air passing through the return portions 201a flows smoothly, thereby reducing wind noise.

In Embodiment 3, the straight portions 201b come into contact with the bottom surfaces of the slots 207a, and the gaps A are provided between the end portions of the teeth 207b and the straight portions 201b on a radially innermost side inside the slots 207a. For that reason, although the strands of wire 201 may move to the inner radial side due to springback of the strands of wire 201 when the straight portions 201b of the strands of wire 201 are inserted into the slots 207a of the base core 207, contact between the end portions of the teeth 207b and the base core 207 can be prevented when bending the base core 207, significantly decreasing insulation defects in the strands of wire 201.

Because an outer circumferential surface of the rotor 7 and an outside diameter of the fans 5 are distanced proportionately farther from the strands of wire 201 on the radially innermost side inside the slots 207a, resistance to the cooling air flow generated by the fans 5 is reduced, reducing wind noise.

Furthermore, because the gaps A are disposed on the inner radial surface of the slots 207a, the cooling air enters into the gaps A, and because the strands of wire 201 on the radially outermost side inside the slots 207a are in contact with the bottom surfaces of the slots 207, cooling of the stator winding 206 is improved.

Moreover, in Embodiment 3, three units of the wave-wound winding assemblies 205 are used to form a serial winding construction having six turns per phase, but it is also possible to form a parallel winding construction having three turns. Naturally, the number of turns per phase can also be increased by increasing the number of winding assemblies 205 to four or five units, for example.

Due to certain characteristics of alternators, the circumferential dimensions of the teeth are sometimes reduced as a result of there being a large number of slots and differences in the pitch between opening portions of the slots. In such cases, when mounting the windings into the slots with the stator core in a cylindrical shape, a large load is applied to the teeth in a circumferential direction, causing the teeth to deform easily, but in the above embodiments, the load is reduced, suppressing deformation of the teeth.

In each of the embodiments, because the number of slots per pole per phase is two, the winding assemblies are prepared using twelve strands of wire, but the technique can also be applied to one slot or three or more slots per pole per phase, and the number of the strands of wire constituting the winding assemblies may be chosen as needed to match the number of slots per pole per phase.

As explained above, a method for manufacturing an alternator according to one aspect of the present invention comprises: preparing a winding assembly formed by bending the strands of wire so as to have straight portions which fit into the slots; forming a base core by laminating plate-shaped magnetic members formed with the slots; stacking the winding assembly on the base core and pressing the winding assembly such that the straight portions enter the slots; and forming the stator core by bending the base core into a cylindrical shape and abutting end surfaces of the base core. Therefore, the winding assembly is integrated with the base core by merely moving the winding assembly in one way, the winding sub-portions is formed by continuous winding of long strands of wire so that the manufacturing operation for a stator having a high degree of coil end neatness is greatly facilitated, making mass production possible.

According to another aspect of the present invention, a method for manufacturing an alternator comprises: preparing winding assembly formed by bending the strands of wire so as to have straight portions which fit into the slots; forming a base core by laminating plate-shaped magnetic members formed with the slots; stacking the winding assembly on the base core and pressing the winding assembly such that the straight portions enter the slots; forming the inner circumferential core portion by bending the base core into a cylindrical shape; and fitting the outer circumferential core portion over the inner circumferential core portion. Therefore, the winding assembly is integrated with the base core of the inner circumferential core portion by merely moving the winding assembly in one way, the winding sub-portion is formed by continuous winding of long strands of wire so that the manufacturing operation for a stator having a high degree of coil end neatness is greatly facilitated, making mass production possible. Furthermore, the force required to bend the inner circumferential core portion is reduced. The rigidity of the stator is improved and the formation of gaps at the abutting portion is reduced by the outer circumferential core portion, reducing magnetic resistance and improving output.

According to one form of the method for manufacturing an alternator, the winding assembly may be a flat shape. Therefore, the operation of integrating the winding assemblies is improved and the winding assemblies are made compact, facilitating handling.

According to another form of the method for manufacturing an alternator, winding assembly may be softened by heat treatment. Therefore, the load of the bending process on the base core is reduced.

According to still another form of the method for manufacturing an alternator, longitudinal end portions of the base core may be first formed by bending to ensure roundness when the base core is bent into the cylindrical shape. Therefore, a smooth curved surface is obtained even in the vicinity of the abutting portion when the bending process is applied to the base core.

According to still another form of the method for manufacturing an alternator, width dimensions of opening portions of the slots of the base core may be larger than width dimensions of the straight portions of the wire-strand group before the base core is bent, and width dimensions of the opening portions of the slots of the base core are smaller than the width dimensions of the straight portions of the wire-strand group after the base core is bent. Therefore, the strands of wire can be installed in the slots without deforming the end portions of the teeth or the strands of wire.

According to still another form of the method for manufacturing an alternator, width dimensions of the opening portions of the slots of the base core may be reduced by pressing and plastically deforming end portions of teeth defining the slots of the base core after the base core and the wire-strand group have been integrated. Therefore, the strands of wire are prevented from coming out of the slots, and the surfaces of the teeth facing the rotor are increased, improving output proportionately and enabling wind noise to be reduced.

According to still another form of the method for manufacturing an alternator, a cross section of the strands of wire may be substantially rectangular in shape. Therefore, the space factor of the strands of wire inside the slots can be easily increased, enabling the resistance value of the stator winding to be suppressed, and also enabling temperature increases in the stator winding to be suppressed.

Because side surfaces of the strands of wire and wall surfaces of the slots may come into surface contact with each other, thermal conductivity is promoted, enabling temperature increases in the stator winding to be further suppressed.

According to still another form of the method for manufacturing an alternator, a cross section of the strands of wire may be substantially circular in shape. Therefore, the strands of wire deform easily, making it easy to form the winding assembly, and the frequency of peeling of the insulation coating is reduced, improving insulation of the strands of wire.

Although end portions of the strands of wire come into contact with each other when the end portions are connected together to form the stator winding, and the return portions of the strands of wire come into contact with each other due to vibrations, etc., when the alternator is in operation, the frequency of peeling of the insulation coating is reduced, improving insulation of the strands of wire.

When connecting the end portions of the strands of wire together, the insulation coating on the end portions needs to be stripped off, but the stripping operation is simplified.

Because the cooling air flows smoothly through the return portions, wind noise is reduced.

According to still another form of the method for manufacturing an alternator, the straight portions of the winding assemblies may be arranged in a number of layers in a radial direction within the slots. Therefore, by stacking the winding assembly in layers, the number of layers of the strands of wire inside the slots can be easily increased.

According to still another form of the method for manufacturing an alternator, the straight portions of the winding assemblies substantially may come into contact with a bottom surface of the slots; and gaps may be provided between the straight portions on a radially innermost side and shoulder portions of end portions of teeth defining the slots. Therefore, Insulation defects in the strands of wire due to contact between the end portions of the teeth and the strands of wire on the radially innermost side during the process of bending the base core can be reduced.

Because an outer circumferential surface of the rotor and an outside diameter of the fans secured to the end surfaces of the rotor are distanced proportionately farther from the strands of wire on the radially innermost side inside the slots, resistance to the cooling air flow generated by the fans is reduced, reducing wind noise.

Because the cooling air enters into the gaps on the inner radial side of the slots and heat from the strands of wire on the radially outermost side inside the slots is transmitted to the stator core via the bottom surface of the slots, cooling of the stator winding is improved.

What is claimed is:

1. A method for manufacturing an alternator comprising:
   a rotor for forming north-seeking (N) and south-seeking (S) poles alternately about a rotational circumference; and
   a stator comprising:
      a stator core surrounding said rotor; and
      a stator winding installed in said stator core,
      said stator core being formed with a number of slots extending axially at a predetermined pitch in a circumferential direction, and said stator winding comprising a number of winding sub-portions in which long strands of wire are wound so as to alternately occupy an inner layer and an outer layer in a slot depth direction within said slots at intervals of a predetermined number of slots, said strands of wire folding back outside said slots at axial end surfaces of said stator core,
      said number of winding portions being constructed with at least one winding assembly formed by simultaneously bending and folding a plurality of said strands of wire, said winding assembly being constructed by arranging at one slot pitch offset the same number of wire-strand pairs as said predetermined number of slots, each of said wire-strand pairs being constructed by arranging two strands of wire so that straight portions alternately overlap at a predetermined pitch, each of said strands of wire being formed into a pattern in which said straight portions are connected by turn portions so as to be arranged at a pitch of said predetermined number of slots and adjacent straight portions are offset so as to alternately occupy said inner layer and said outer layer in said slot depth direction, end portions of each of said strands of wire respectively extending outwards at both sides of both ends of said winding assembly, wherein said stator winding is constructed by connecting said end portions of said strands of wire which construct said winding assembly installed in said stator core, said end portions extending outwards from said slot in both axial directions of said stator core, said method for manufacturing said alternator comprising:

preparing a plurality of winding assemblies each formed by bending said strands of wire so that each winding assembly has straight portions which fit into said slots;

forming a base core by laminating plate-shaped magnetic members formed with said slots;

stacking said winding assemblies on said base core and pressing said winding assemblies such that said straight portions enter said slots; and forming said stator core by bending said base core into a cylindrical shape and abutting end surfaces of said base core.

2. A method for manufacturing an alternator comprising:

a rotor for forming north-seeking (N) and south-seeking (S) poles alternately about a rotational circumference; and a stator comprising:
a stator core surrounding said rotor; and
a stator winding installed in said stator core, said stator core comprising:
an inner circumferential core portion being formed with a number of slots extending axially at a predetermined pitch in a circumferential direction; and
an outer circumferential core portion fitting over an outer circumferential surface of said inner circumferential core portion, and said stator winding comprising a number of winding sub-portions in which long strands of wire are wound so as to alternately occupy an inner layer and an outer layer in a slot depth direction within said slots at intervals of a predetermined number of slots, said strands of wire folding back outside said slots at axial end surfaces of said stator core, said number of winding portions being constructed with at least one winding assembly formed by simultaneously bending and folding a plurality of said strands of wire, said winding assembly being constructed by arranging at one slot pitch offset the same number of wire-strand pairs as said predetermined number of slots, each of said wire-strand pairs being constructed by arranging two strands of wire so that straight portions alternately overlap at a predetermined pitch, each of said strands of wire being formed into a pattern in which said straight portions are connected by turn portions so as to be arranged at a pitch of said predetermined number of slots and adjacent straight portions are offset so as to alternately occupy said inner layer and said outer layer in said slot depth direction, end portions of each of said strands of wire respectively extending outwards at both sides of both ends of said winding assembly, wherein said stator winding is constructed by connecting said end portions of said strands of wire which construct said winding assembly installed in said stator core, said end portions extending outwards from said slot in both axial directions of said stator core, said method for manufacturing the alternator comprising:

preparing winding assemblies formed by bending said strands of wire so that each winding assembly has straight portions which fit into said slots;

forming a base core by laminating plate-shaped magnetic members formed with said slots;

stacking said winding assemblies on said base core and pressing said winding assemblies such that said straight portions enter said slots;

forming said inner circumferential core portion by bending said base core into a cylindrical shape; and fitting said outer circumferential core portion over said inner circumferential core portion.

3. The method for manufacturing an alternator according to claim 1 wherein each of said winding assemblies is a flat shape.

4. The method for manufacturing an alternator according to claim 1 wherein each of said winding assemblies is softened by heat treatment.

5. The method for manufacturing an alternator according to claim 1 wherein longitudinal end portions of said base core are first formed by bending to ensure roundness when said base core is bent into said cylindrical shape.

6. The method for manufacturing an alternator according to claim 1 wherein width dimensions of opening portions of said slots of said base core are larger than width dimensions of said straight portions of said winding assemblies before said base core is bent, and width dimensions of said opening portions of said slots of said base core are smaller than said width dimensions of said straight portions of said winding assemblies after said base core is bent.

7. The method for manufacturing an alternator according to claim 1 wherein width dimensions of said opening portions of said slots of said base core are reduced by pressing and plastically deforming end portions of teeth defining said slots of said base core after said base core and said winding assemblies have been integrated.

8. The method for manufacturing an alternator according to claim 1 wherein a cross section of said strands of wire is substantially rectangular in shape.

9. The method for manufacturing an alternator according to claim 1 wherein a cross section of said strands of wire is substantially circular in shape.

10. The method for manufacturing an alternator according to claim 1 wherein said straight portions of said winding assemblies are arranged in a number of layers in a radial direction within said slots.

11. The method for manufacturing an alternator according to claim 1 wherein:

said straight portions of said winding assemblies substantially come into contact with a bottom surface of said slots; and gaps are provided between said straight portions on a radially innermost side and shoulder portions of end portions of teeth defining said slots.

* * * * *